(12) United States Patent
Masel et al.

(10) Patent No.: US 11,888,272 B2
(45) Date of Patent: Jan. 30, 2024

(54) TOUCH PROTECTED BUSBAR SYSTEM

(71) Applicant: WOEHNER BESITZ GMBH, Roedental (DE)

(72) Inventors: Joram Masel, Küps-Oberlangenstadt (DE); Philipp Steinberger, Coburg (DE); Hubert Lenker, Sonneberg (DE); Alexander Scholz, Grub am Forst (DE)

(73) Assignee: WOEHNER BESITZ GMBH, Roedental (DE)

( * ) Notice: Subject to any disclaimer, the term of this patent is extended or adjusted under 35 U.S.C. 154(b) by 617 days.

(21) Appl. No.: 16/977,295

(22) PCT Filed: Feb. 21, 2019

(86) PCT No.: PCT/EP2019/054343
§ 371 (c)(1),
(2) Date: Sep. 1, 2020

(87) PCT Pub. No.: WO2019/174886
PCT Pub. Date: Sep. 19, 2019

(65) Prior Publication Data
US 2021/0006047 A1 Jan. 7, 2021

(30) Foreign Application Priority Data
Mar. 15, 2018 (EP) .................................. 18162101

(51) Int. Cl.
*H01R 25/14* (2006.01)
*H01R 4/38* (2006.01)
(Continued)

(52) U.S. Cl.
CPC ............. *H01R 25/145* (2013.01); *H01R 4/38* (2013.01); *H01R 25/14* (2013.01); *H02B 1/21* (2013.01); *H02G 5/04* (2013.01); *H02G 5/06* (2013.01)

(58) Field of Classification Search
CPC ........ H01R 25/145; H01R 4/38; H01R 25/14; H01R 25/162; H02B 1/21; H02B 1/14; H02G 5/04; H02G 5/06
See application file for complete search history.

(56) References Cited

U.S. PATENT DOCUMENTS 4,699,445 A * 10/1987 Porta ...................... H01R 13/11
439/830
9,515,397 B2 * 12/2016 Buettner .................. H02G 5/04
(Continued)

FOREIGN PATENT DOCUMENTS

| CN | 102804522 A | 11/2012 |
|---|---|---|
| CN | 202 759 120 U | 2/2013 |

(Continued)

OTHER PUBLICATIONS

International Search Report corresponding to international application No. PCT/EP2019/054343 dated Apr. 24, 2019, (11 pages).

*Primary Examiner* — Travis S Chambers
(74) *Attorney, Agent, or Firm* — Maginot, Moore & Beck LLP

(57) ABSTRACT

A touch protected busbar system (TP-BSYS) comprising at least one hybrid busbar (1) having a current-carrying rail profile (2) and a contact-receiving rail profile (3) providing contact openings (4) configured to receive protruding electrical contacts (6) of electrical devices (ED-A) to be connected to said touch protected busbar system (TP-BSYS), wherein the at least one hybrid busbar (1) is at least partially covered by electrical isolating touch protection elements (TPE) of said touch protected busbar system (TP-BSYS) and/or at least partially encapsulated by an electrical isolating layer.

30 Claims, 31 Drawing Sheets

(51) Int. Cl.
*H02G 5/04* (2006.01)
*H02B 1/21* (2006.01)
*H02G 5/06* (2006.01)

(56) References Cited

U.S. PATENT DOCUMENTS

| | | | | |
|---|---|---|---|---|
| 2007/0111592 | A1* | 5/2007 | Smith | H01R 25/003 |
| | | | | 439/502 |
| 2012/0264327 | A1 | 10/2012 | Carnevale et al. | |
| 2016/0366780 | A1* | 12/2016 | Liang | H01R 12/52 |

FOREIGN PATENT DOCUMENTS

| | | | |
|---|---|---|---|
| CN | 203377458 U | 1/2014 | |
| CN | 104966964 A | 10/2015 | |
| CN | 206313243 U | 7/2017 | |
| CN | 10769035 A | 2/2018 | |
| DE | 3817440 A1 * | 11/1989 | |
| DE | 41 09 040 A1 | 9/1992 | |
| DE | 102016107565 A1 | 10/2017 | |
| EP | 3 136 524 A1 | 3/2017 | |
| JP | 2010263682 A | 11/2010 | |
| WO | 2016156423 A1 | 10/2016 | |
| WO | 2017198642 A1 | 11/2017 | |
| WO | WO-2017192146 A1 * | 11/2017 | H01R 12/7082 |

* cited by examiner

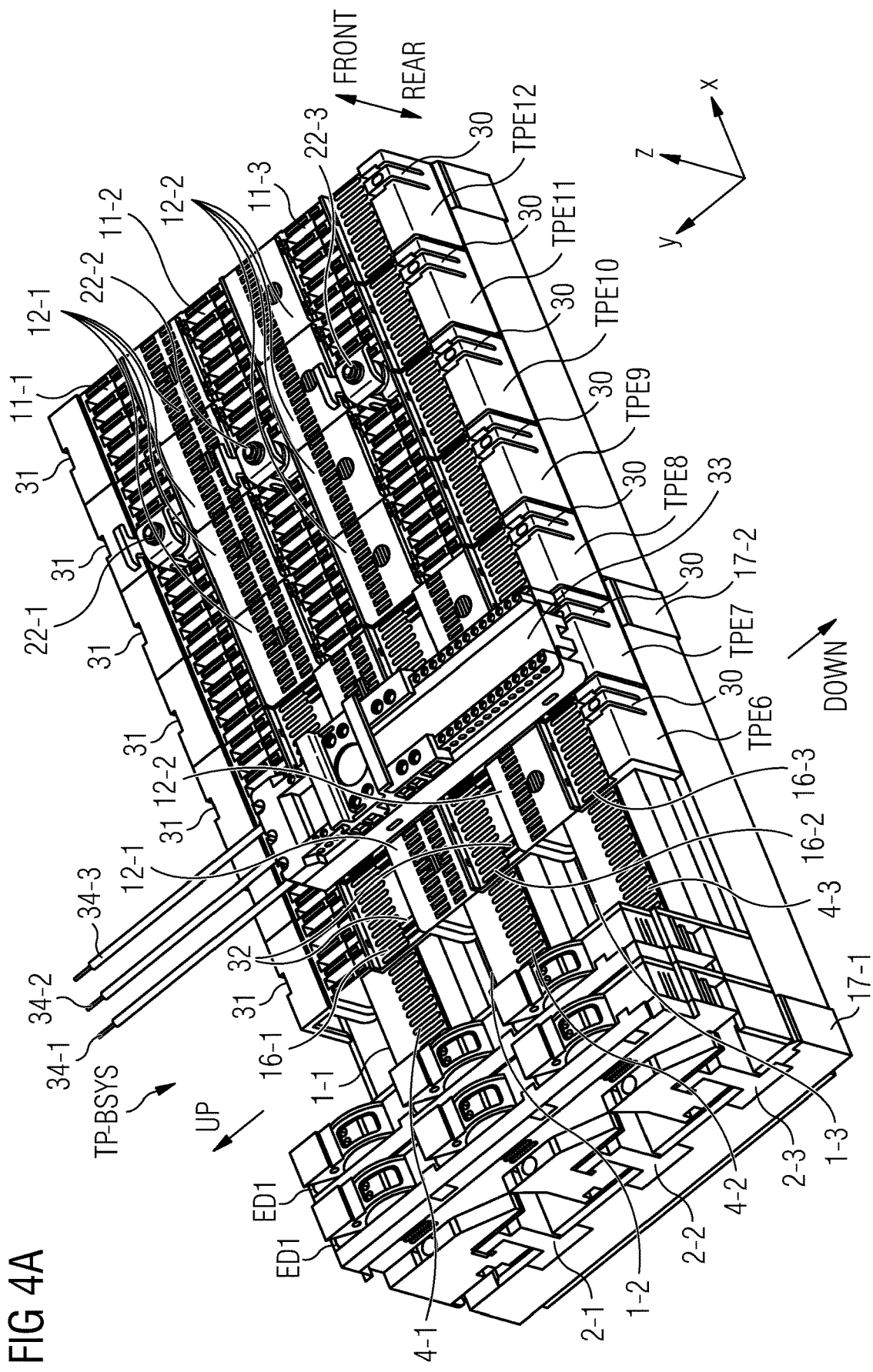

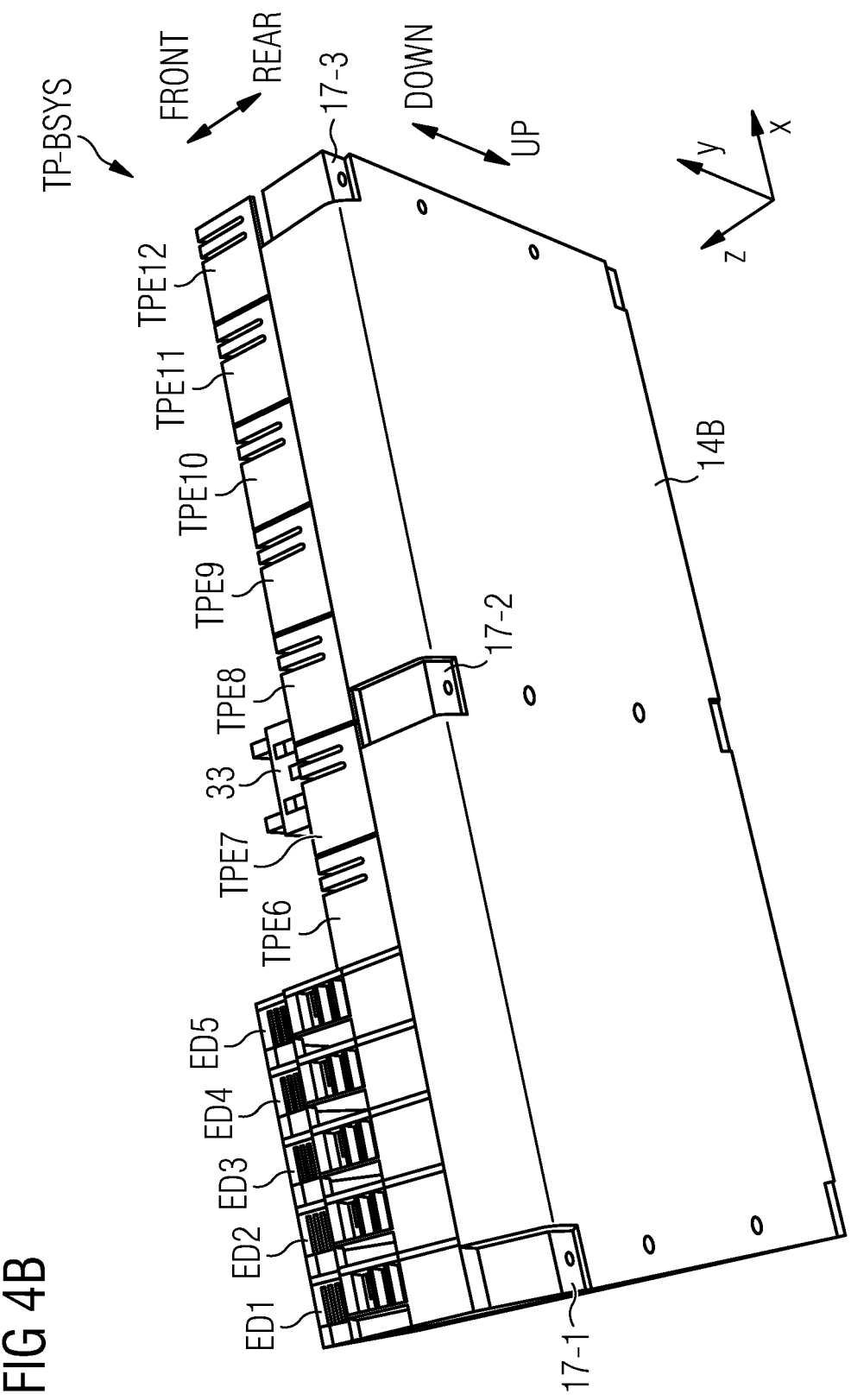

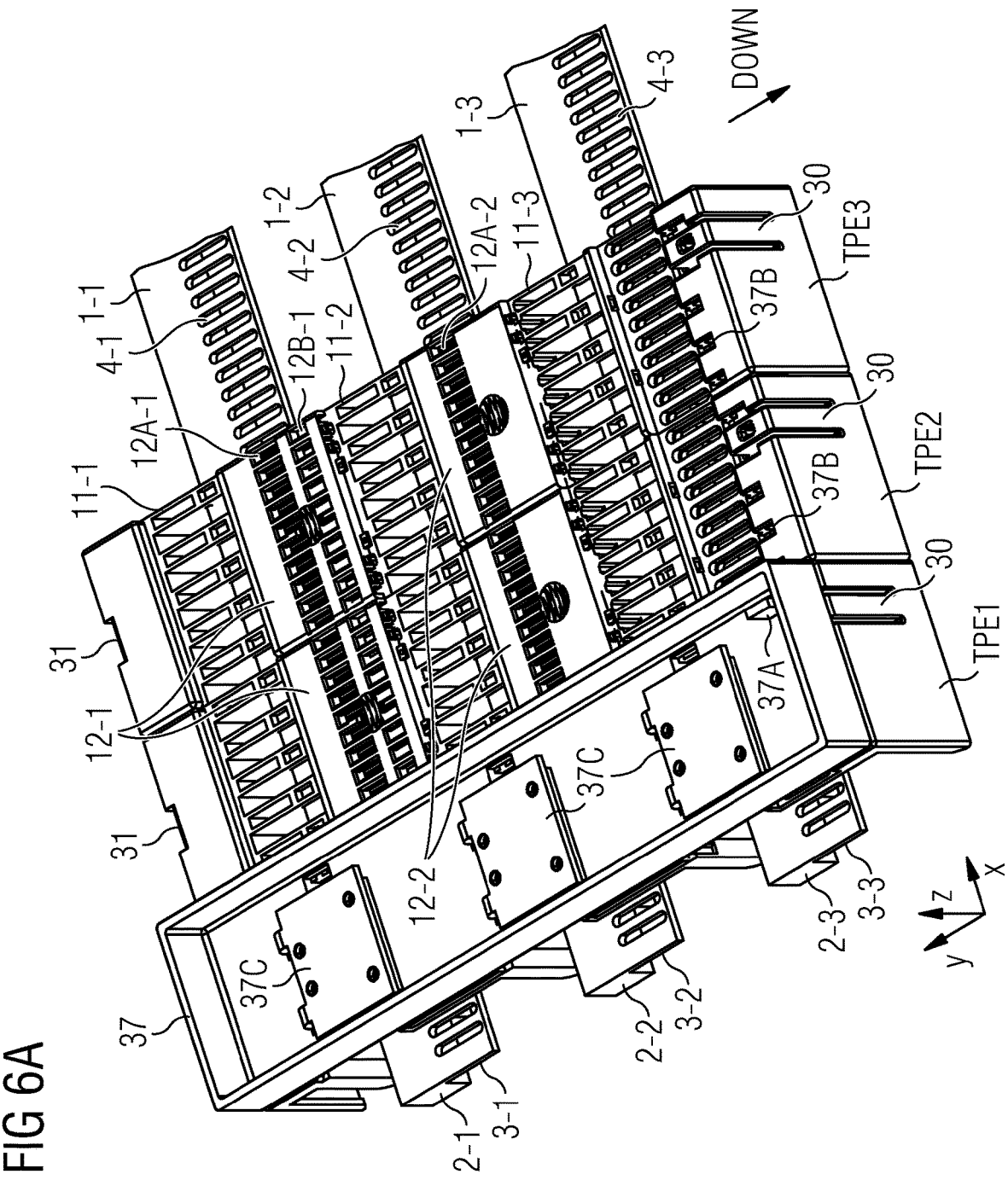

TOUCH PROTECTED BUSBAR SYSTEM

PRIORITY CLAIM

This application is a 35 U.S.C. 371 National Stage application of PCT/EP2019/054343, filed Feb. 21, 2019, and claims priority to European Application No. EP 18162101.2 filed on Mar. 15, 2018. The entire contents of the above-mentioned patent applications are incorporated herein by reference as part of the disclosure of this U.S. application.

BACKGROUND

The invention relates to a touch protected busbar system which can be used flexibly for a wide variety of use cases.

Busbar systems can comprise one or several busbars for providing power supply for electrical devices. In conventional busbar systems, electrical devices are directly connected to the busbar system by means of adapters mounted to different busbars of the busbar system or electrical devices are connected directly on the busbars without an adapter. Busbars can for example carry one or several AC mains power supply voltages. Busbars can also be used to carry DC voltages. One or more busbars can be mounted in parallel and can carry different phases like L1, L2, L3, PE and N of a power supply system. An electrical device which requires electrical power supply is usually connected to the busbars carrying the AC mains power supply and voltages by means of clamps or conductors or specific adapters. Accordingly, mounting of electrical devices in such a conventional busbar system can be cumbersome and is only possible with voltage-free busbars. To increase the safety of the users areas without any devices need to be covered.

Accordingly, it is an object of the present invention to provide a touch protected busbar system or busbar system which allows to mount electrical devices on a busbar system without use of any additional adapter elements and which provides touch protection for a user and thereby increasing safety significantly. Furthermore, the busbar system according to the present invention allows a mounting of devices with busbars under voltage.

This object is achieved by a touch protected busbar system comprising the features of claim 1.

The invention provides according to a first aspect a touch protected busbar system comprising
at least one hybrid busbar having a current-carrying rail profile and a contact-receiving rail profile providing contact openings configured to receive protruding electrical contacts of electrical devices to be connected to said touch protected busbar system,
wherein the at least one hybrid busbar is at least partially covered by electrical isolating touch protection elements of said touch protected busbar system and/or at least partially encapsulated by an electrical isolating layer.

The touch protected busbar system according to the present invention is very flexible and can comprise both hybrid busbars as well as conventional busbars. The electric isolating touch protection elements can be mounted easily on the busbars and provide electrical isolation for any user or operator.

A further advantage of the touch protected busbar system according to the first aspect of the present invention is that the electrical devices can be easily connected to the touch protected busbar system on a front side without removing the protecting electrical isolating touch protection elements of the touch protected busbar system.

Moreover a connection of electrical devices to the touch protected busbar system can be performed very fast and without requiring any tools.

The touch protected busbar system according to the present invention has the further advantage that it is completely compatible with existing conventional busbar systems comprising conventional busbars with a rectangular cross section.

The touch protected busbar system according to the present invention has also the advantage that a first type of electrical devices having protruding electrical contacts can be inserted into corresponding contact openings of a contact-receiving rail profile without any use of adapter elements from the front side of the busbar system. The touch protected busbar system has the additional advantage that another type of electrical devices which do not comprise protruding electrical contacts can also be mounted on the same hybrid busbar using hook-shaped device mounting latches of the respective electrical devices. Consequently, the touch protected busbar system according to the present invention is very flexible in use and allows to connect both a first type of electrical devices with protruding electrical contacts and/or to connect a second type of electrical devices having hook-shaped device mounting latches at the same time.

A further significant advantage of the touch protected busbar system according to the present invention as defined by claim 1 is that it allows to use hybrid busbars having a current-carrying rail profile and a contact-receiving rail profile wherein the current-carrying rail profile of the hybrid busbar can carry electrical currents with high current amplitudes.

In a possible embodiment of the touch protected busbar system according to the first aspect of the present invention, the at least one hybrid busbar consists of a current-carrying rail profile and a contact-receiving rail profile forming an integrated monolithic hybrid busbar.

In a further possible embodiment of the touch protected busbar system according to the first aspect of the present invention, the at least one hybrid busbar is formed by connecting a current-carrying rail profile and a contact-receiving rail profile. In this embodiment, the current-carrying rail profile and the contact-receiving rail profile can form separate elements which are connected mechanically with each other.

In a further possible embodiment of the touch protected busbar system according to the first aspect of the present invention, the electrical isolating touch protection elements mounted on the hybrid busbars and/or non-hybrid busbars comprise contact openings aligned with contact openings of contact-receiving rail profiles of hybrid busbars covered by said touch protection elements.

In a further possible embodiment of the touch protected busbar system according to the first aspect of the present invention, the electrical isolating touch protection elements mounted by means of busbar mounting hooks on the busbars comprise latch openings which are adapted to receive device mounting latches of electrical devices to be connected to said touch protected busbar system.

In a further possible embodiment of the touch protected busbar system according to the first aspect of the present invention, the device mounting latches of the electrical devices are hook-shaped and adapted to be passed through the latch openings of the electrical isolating touch protection elements and to engage the hybrid busbars as well as the non-hybrid busbars covered by the touch protection elements from behind.

In this embodiment, the electrical devices can be connected electrically by means of a clamping unit or clamping elements.

In a further possible embodiment of the touch protected busbar system according to the first aspect of the present invention, the electrical isolating touch protection element comprises at least one configurable electrical isolating touch protection element having a configuration portion adapted to provide a first configuration where protruding electrical contacts of electrical devices can be passed through contact openings of the respective touch protection element and can be plugged into aligned contact openings of contact-receiving rail profiles of hybrid busbars covered by said touch protection element.

In a further possible embodiment of the touch protected busbar system according to the first aspect of the present invention, the at least one configuration portion of the configurable electrical isolating touch protection element is adapted to provide a second configuration where device mounting latches of electrical devices can be passed through latch openings of the respective touch protection element and can engage hybrid busbars and/or non-hybrid busbars covered by said touch protection element from behind.

In a further possible embodiment of the touch protected busbar system according to the first aspect of the present invention, the at least one configuration portion of the configurable electrical isolating touch protection element is moveable between a first position to provide a first configuration and a second position to provide a second configuration of said configurable touch protection element.

In a still further possible embodiment of the touch protected busbar system according to the first aspect of the present invention, the at least one configuration portion of said configurable electrical isolating touch protection element is mounted on or integrated with said electrical isolating touch protection element in a fixed position to provide either a first configuration or a second configuration of said configurable touch protection element.

In a still further possible embodiment of the touch protected busbar system according to the first aspect of the present invention, the electrical isolating touch protection element comprises a preconfigured touch protection element providing a first configuration where protruding electrical contacts of electrical devices can be passed through contact openings of the respective preconfigured touch protection element and can be plugged into aligned contact openings of contact-receiving rail profiles of hybrid busbars covered by said preconfigured touch protection element or providing a second configuration where device mounting latches of electrical devices can be passed through latch openings of the respective preconfigured touch protection element and can engage hybrid busbars or non-hybrid busbars covered by said preconfigured touch protection element from behind.

In a further possible embodiment of the touch protected busbar system according to the first aspect of the present invention, the electrical isolating touch protection element comprises a preconfigured touch protection element adapted to cover hybrid busbars and/or non-hybrid busbars completely.

In a still further possible embodiment of the touch protected busbar system according to the first aspect of the present invention, the contact openings of the electrical isolating touch protection elements mounted on busbars of said touch protected busbar system are equally spaced and aligned with equally spaced contact openings of contact-receiving rail profiles of the hybrid busbars covered by said touch protection elements.

In a further possible embodiment of the touch protected busbar system according to the first aspect of the present invention, the at least one hybrid busbar of said touch protected busbar system and other hybrid busbars or non-hybrid busbars of said touch protected busbar system are mounted on busbar support elements of said touch protected busbar system.

In a still further possible embodiment of the touch protected busbar system according to the first aspect of the present invention, the hybrid busbars and/or non-hybrid busbars of said touch protected busbar system comprise centering cavities or centering protrusions used for precise positioning the touch protection elements when mounted on the busbars.

In a further possible embodiment of the touch protected busbar system according to the first aspect of the present invention, the system further comprises at least one electrical isolating touch protection panel mounted on the rear side of said touch protected busbar system.

In a still further possible embodiment of the touch protected busbar system according to the first aspect of the present invention, several electrical isolating touch protection elements are integrated forming a front side electrical isolating touch protection panel at the front side of said touch protected busbar system.

In a further possible embodiment of the touch protected busbar system according to the first aspect of the present invention, the front side electrical isolating touch protection panel is mechanically connected with a rear side electrical isolating touch protection panel at the rear side of said touch protected busbar system to form an electrical isolating housing encapsulating the busbars of said touch protected busbar system.

In a still further possible embodiment of the touch protected busbar system according to the first aspect of the present invention, the electrical isolating touch protection element comprises a mechanical removal protection adapted to block an unwanted removal of the respective touch protection element from said touch protected busbar system.

In a still further possible embodiment of the touch protected busbar system according to the first aspect of the present invention, the electrical isolating touch protection element is adapted to cover at least one hybrid busbar and/or non-hybrid busbar mounted in parallel in said touch protected busbar system.

In a further possible embodiment of the touch protected busbar system according to the first aspect of the present invention, the electrical isolating touch protection element is adapted to cover one or two or three or four or five (L1, L2, L3, N, PE) hybrid or non-hybrid busbars mounted in parallel in said touch protected busbar system.

In a further possible embodiment of the touch protected busbar system according to the first aspect of the present invention, the electrical isolating touch protection element comprises mechanical interfaces to connect mechanical components with said touch protected busbar system, wherein the mechanical components connected via mechanical interfaces of the electrical isolating touch protection elements to said touch protected busbar system comprise components to receive additional busbars used to carry electrical current and/or used to carry information and/or auxiliary components, in particular auxiliary components used to label the respective touch protection elements.

In a further possible embodiment of the touch protected busbar system according to the first aspect of the present invention, the electrical isolating touch protection elements comprise slots to receive protruding mechanical locking elements of electrical devices mounted on said touch protection elements and electrically connected to the hybrid busbars and/or to the non-hybrid busbars covered by the respective touch protection elements.

In a further possible embodiment of the touch protected busbar system according to the first aspect of the present invention, the electrical isolating touch protection elements are made of fire-resistant and/or heat-conducting plastic material, in particular a fire-resistant and heat-conducting transparent plastic material.

In a still further possible embodiment of the touch protected busbar system according to the first aspect of the present invention, the hybrid busbar comprises at least one bounding geometry having a rectangular cross section engageable by hook-shaped mounting latches of electrical devices or by electrical connectors or of electrical adapters to be connected to said touch protected busbar system.

In a further possible embodiment of the touch protected busbar system according to the first aspect of the present invention, the hybrid busbar is formed asymmetrically with the contact-receiving rail portion attached lateral to the current-carrying rail profile of the respective hybrid busbar.

In a further possible alternative embodiment of the touch protected busbar system according to the first aspect of the present invention, the hybrid busbar can be formed symmetrically with a contact-receiving rail profile connected to the current-carrying rail profile.

In a further possible embodiment of the touch protected busbar system according to the first aspect of the present invention, the electrical isolating touch protection elements provide an intrusion protection according to protection marking code IP20B.

In a further possible embodiment of the touch protected busbar system according to the first aspect of the present invention, the electrical isolating touch protection elements provide an interface for an additional protection element in order to provide protection marking IP40D or IP30C.

In a still further possible embodiment of the touch protected busbar system according to the first aspect of the present invention, the current-carrying rail profile of the hybrid busbar comprises a C-shaped profile and one or more T-shaped profiles.

In a still further possible embodiment of the touch protected busbar system according to the first aspect of the present invention, the touch protected busbar system is integrated in a housing of a distribution box or of a distribution enclosure.

In a still further possible embodiment of the touch protected busbar system according to the first aspect of the present invention, the system further comprises a current-feeding component adapted to feed at least one electrical supply phase to the hybrid and/or non-hybrid busbars covered by the touch protection elements of the touch protected busbar system.

In a still further possible embodiment of the touch protected busbar system according to the first aspect of the present invention, a configuration portion of the touch protection element comprises openings to receive coding protrusions of electrical devices to provide a reverse voltage protection of the electrical devices.

In a further possible embodiment of the touch protected busbar system according to the first aspect of the present invention, configuration portions of the touch protection elements comprise slots to receive mechanical locking elements of electrical devices used to mount the electrical devices on said touch protection elements.

In a still further possible embodiment of the touch protected busbar system according to the first aspect of the present invention, the electrical isolating touch protection elements are adapted to cover and isolate additional busbars and/or electrical conductors used to transport analog or digital information signals, AC or DC supply voltages or to provide reference potentials.

In a still further possible embodiment of the touch protected busbar system according to the first aspect of the present invention, the mechanical removal protection is unreleasable.

In a still further possible alternative embodiment of the touch protected busbar system according to the first aspect of the present invention, the mechanical removal protection is releasable by a slide protection release tool, in particular by a screwdriver or by a specific protection release tool.

In a still further possible embodiment of the touch protected busbar system according to the first aspect of the present invention, the system comprises longitudinal busbar connectors adapted to connect mechanically and electrically at least one non-hybrid busbar with at least one hybrid busbar of the system.

The invention provides according to a further second aspect a hybrid busbar which can be used for the touch protected busbar system according to the first aspect of the present invention, wherein said hybrid busbar comprises
a current-carrying rail profile adapted to carry an electrical current with a predefined high current amplitude and
at least one contact-receiving rail profile having a plurality of equally spaced contact-openings configured to receive protruding electrical contacts of electrical devices to be connected to said touch protected busbar system,
wherein the current-carrying rail profile and the contact-receiving rail profile are connected with each other to form a hybrid busbar which is engageable from behind by hook-shaped device mounting latches of electrical devices to be connected to said touch protected busbar system.

The invention provides according to a further aspect a configuration platform used for configuring a touch protected busbar system according to the first aspect of the present invention, wherein the configuration platform comprises a configuration module adapted to configure touch protection elements in response to configuration data loaded from a database of said configuration platform and/or input via a user interface of said configuration platform.

In a possible embodiment of the configuration platform according to the third aspect of the present invention, the configuration module of said configuration platform is connected via a local or a global data network to a manufacturing machine, in particular to a 3D printer or to an injection moulding machine, adapted to manufacture automatically the configured touch protection elements according to their configurations.

In the following, possible embodiments of the different aspects of the present invention are described in more detail with reference to the enclosed figures.

FIGS. 4A, 4B show a further view on an exemplary embodiment of a touch protected busbar system according to the first aspect of the present invention;

FIGS. 6A, 6B show further views on an exemplary embodiment of a touch protected busbar system according to the first aspect of the present invention;

Figure 1:
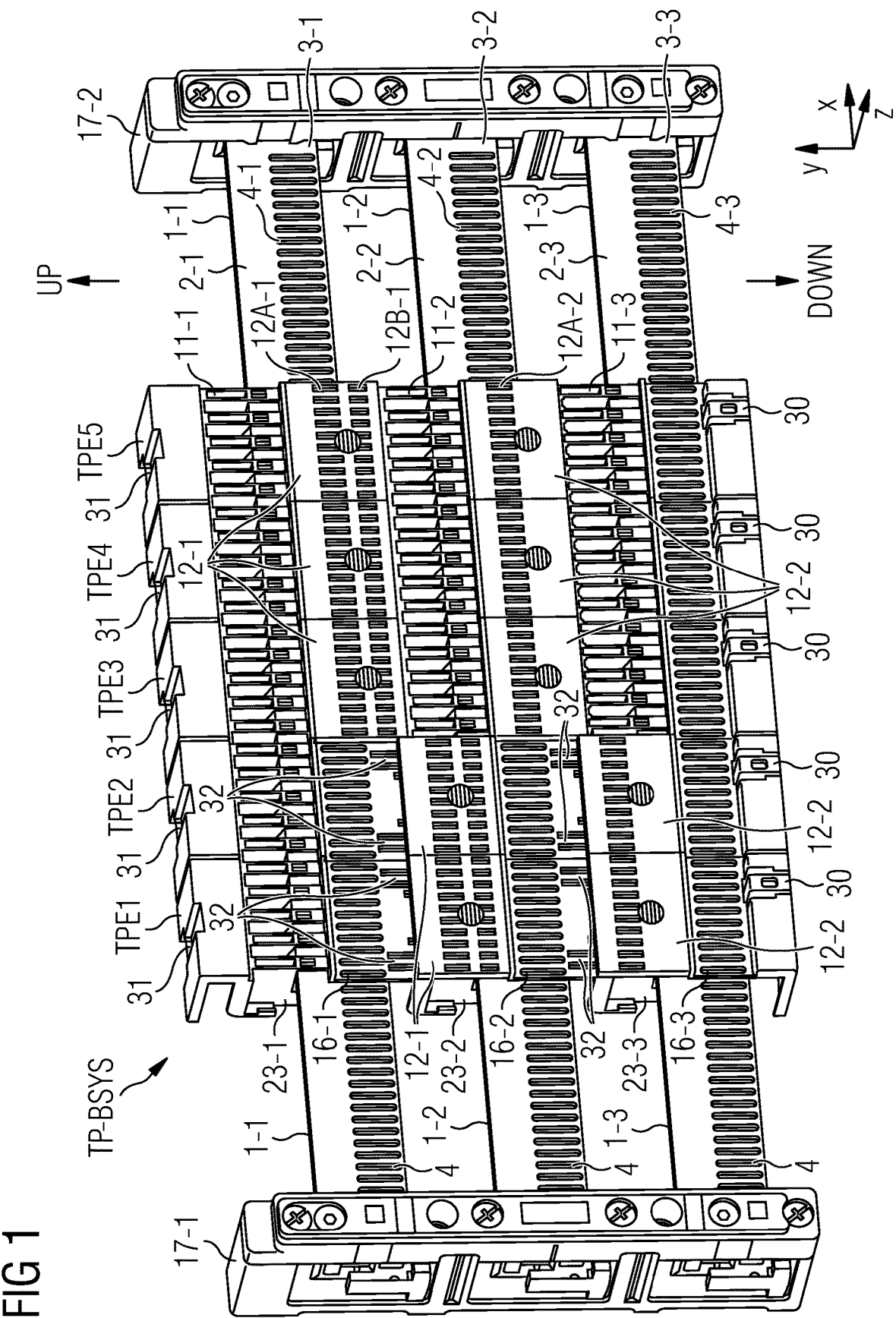
FIG. 1 shows a possible exemplary embodiment of a touch protected busbar system according to the first aspect of the present invention.

As can be seen from the perspective view of FIG. 1, the touch protected busbar system TP-BSYS according to a first aspect of the present invention comprises at least one hybrid busbar 1-$i$. In the illustrated exemplary embodiment of FIG. 1, the touch protected busbar system TP-BSYS comprises three hybrid busbars 1-1, 1-2, 1-3 mounted on busbar support elements 17A, 17B in parallel in x-direction. Each hybrid busbar 1-$i$ has in the illustrated embodiment a current-carrying rail profile 2-$i$ and a contact-receiving rail profile 3-$i$. In the illustrated embodiment of FIG. 1, the current-carrying rail profile 2 and the corresponding contact-receiving rail profile 3 form an integrated monolithic hybrid busbar 1. In the illustrated embodiment, the contact-receiving rail profile 3 of the hybrid busbar 1 is attached lateral to the associated current-carrying profile 2 as shown in FIG. 1. In the illustrated embodiment of FIG. 1, three hybrid busbars 1-1, 1-2, 1-3 are mounted in parallel in x-direction to the touch protected busbar system TP-BSYS. The number of busbars mounted in the touch protected busbar system TP-BSYS can vary depending on the use case. The touch protected busbar system TP-BSYS comprises at least one hybrid or non-hybrid busbar isolated by means of an electrical isolating touch protection element TPE. In the embodiment shown in FIG. 1, the touch protected busbar system TP-BSYS comprises three parallel hybrid busbars 1-1, 1-2, 1-3 formed by integrated monolithic hybrid busbars mounted to the busbar support elements 17A, 17B and covered by several touch protection elements TPE to provide electrical protection for a user or an operator. The current-carrying rail profile 2 of each hybrid busbar 1 is provided to carry the electrical current I to electrical contacts of electrical devices ED connected in z-direction to the touch protected busbar system TP-BSYS. Because of its relatively large cross section the electrical resistance of the current-carrying rail profile 2 is relatively low. Each hybrid busbar 1 comprises besides its current-carrying rail profile 2 a contact-receiving rail profile 3 configured to receive protruding electrical contacts of electrical devices ED to be connected to the touch protected busbar system TP-BSYS. As can be seen in the embodiment illustrated in FIG. 1, the hybrid busbars 1 are at least partially covered by electrically isolating touch protection elements TPE1, TPE2, TPE3, TPE4, TPE5. In a further possible embodiment of the touch protected busbar system TP-BSYS, some or all hybrid busbars 1-$i$ and/or any other conventional busbars can be at least partially covered or encapsulated by an electrical isolating layer to provide additional security.

As can be seen in the embodiment shown in FIG. 1, the electrical isolating touch protection elements TPE1 to TPE5 mounted on the busbars 1-$i$ comprise each a row 16-$i$ of contact openings 16 which are aligned to the contact openings 4-$i$ of the contact receiving profiles 3-$i$ of the hybrid busbars 1-$i$ covered by the respective touch protection elements TPE1 to TPE5. The contact openings 4 of each row 4-$i$ of contact-receiving profiles 3-$i$ are equally spaced in x-direction as illustrated in FIG. 1. The contact openings 16 of the contact opening rows 16-$i$ are also equally spaced in x-direction and aligned with the corresponding contact openings 4-$i$ of the contact-receiving rail profiles 3 of the hybrid busbars 1 located beneath the touch protection elements TPE as illustrated in FIG. 1. The electrical isolating touch protection elements TPE as shown in FIG. 1 are made of a fire-resistant and/or heat-conducting plastic material. The touch protection elements TPE are fire-resistant and can be made in a possible embodiment of a heat-conducting material. In a possible embodiment, the touch protection elements TPE can also be manufactured from a fire-resistant and/or heat-conducting transparent plastic material. In this implementation, the hybrid and/or non-hybrid busbars covered by the touch protection elements TPE are visible to a user and operator. This can facilitate the mounting of electrical devices ED to the touch protected busbar system TP-BSYS. In case that the touch protection elements TPE are made at least partially of transparent plastic material, a user or operator has the possibility to recognize which kind of busbars are covered by the touch protection elements TPE, e.g. whether the touch protection elements TPE cover hybrid busbars 1 and/or non-hybrid busbars. Further, the user can recognize which kind of physical cross section the different busbars behind the electrical isolating touch protection elements TPE have, in particular which current-carrying capabilities.

As illustrated in FIG. 1, the touch protection elements TPE can be mounted to the hybrid and/or non-hybrid busbars by means of busbar mounting hooks 23-*i*. Besides the contact openings 16-*i*, the touch protection elements TPE comprise latch openings 11-*i* adapted to receive device mounting latches 7 of electrical devices ED to be connected to the touch protected busbar system TP-BSYS. In a possible embodiment, also illustrated in FIG. 22 and FIG. 27, the device mounting latches 7 of electrical devices ED can be hook-shaped and be adapted in their form to be passed in z-direction through the latch openings 11 of the electrical isolating touch protection elements TPE. The hook-shaped device mounting latches 7 of the electrical devices ED can engage the hybrid busbars 1 or the non-hybrid busbars covered by the touch protection elements TPE from behind as also shown in the cross section view of FIG. 22 and FIG. 27.

Figure 21:
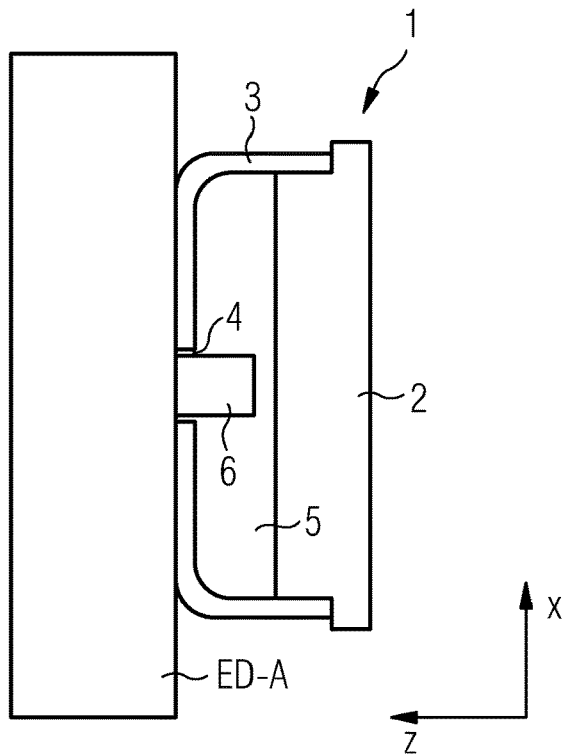
FIGS. 21, 22 illustrate cross sections of different types of electrical devices which can be connected to a touch protected busbar system according to the first aspect of the present invention.

In the illustrated embodiment of FIG. 1, the electrical isolation touch protection elements TPE each comprise at least one configurable electrical isolating touch protection element TPE having a configuration portion 12 adapted to provide either a first configuration or a second configuration. In the illustrated embodiment, each touch protection element TPE comprises two configuration portions 12-1, 12-2. In the illustrated example, the first two touch protection elements TPE1, TPE2 comprise configuration portions 12-1, 12-2 in a first configuration position to provide a first configuration. In the illustrated example of FIG. 1, the touch protection elements TPE3, TPE4, TPE5 comprise configuration portions 12-1, 12-2 both moved in y-direction to another position to provide a second configuration. In the first configuration position, protruding element contacts 6 of electrical devices ED-A can be passed through contact openings 16-*i* of the respective touch protection elements TPE1, TPE2 and can be plugged into aligned contact openings 4-*i* of contact receiving rail profiles 3-*i* of hybrid busbars 1-*i* covered by the respective touch protection elements TPE1, TPE2 as also illustrated in FIG. 21. In the second configuration position of the configuration portions 12-1, 12-2, the electrical isolating touch protection elements such as the touch protection elements TPE3, TPE4, TPE5 are adapted to provide a second configuration where the device mounting latches 7 of electrical devices ED-B can be passed through the latch openings 11-1, 11-2, 11-3 of the respective touch protection elements TPE3, TPE4, TPE5 and can engage the hybrid busbars 1 and/or any non-hybrid busbars covered by the touch protection elements TPE3, TPE4, TPE5 from behind, as also illustrated schematically in FIG. 22 and FIG. 27.

Figure 27:
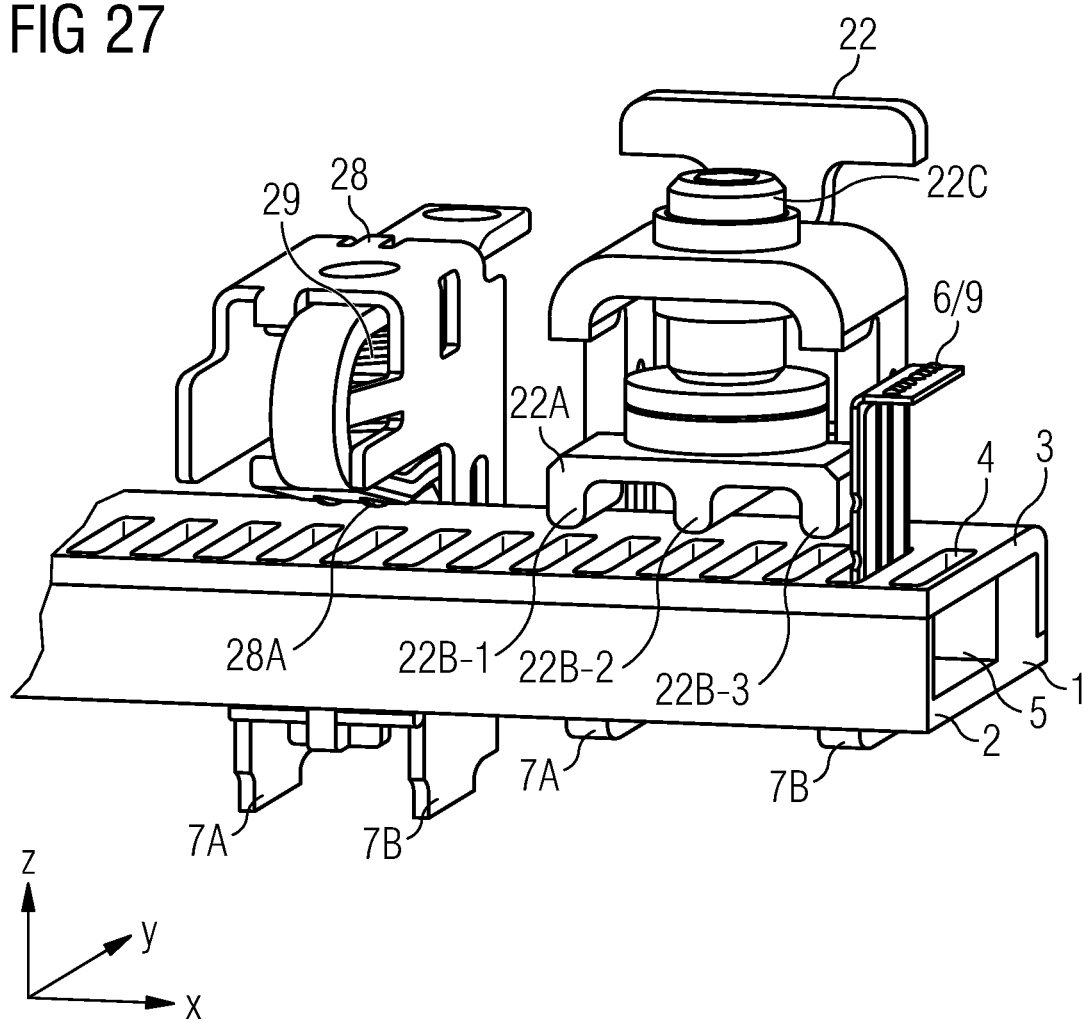
FIG. 27 illustrates two connector assemblies with hook-shaped device mounting latches which can be used to connect electrical devices to a hybrid busbar used in a touch protected busbar system according to the first aspect of the present invention; and one protruding electrical contact

In the illustrated embodiment of FIG. 1, the touch protection elements TPE1 to TPE5 each comprise two configuration portions 12-1, 12-2. In the illustrated embodiment of FIG. 1, the two configuration portions 12-1, 12-2 are both moveable in y-direction between a first position and a second position. In the illustrated embodiment of FIG. 1, the first configuration portion 12-1 as well as the second configuration portion 12-2 of the first touch protection element TPE1 and of the second touch protection element TPE2 are both moved down to a first configuration position. The first configuration position allows to insert in z-direction protruding electrical contacts 6 or 19 (as illustrated in FIG. 27) of electrical devices ED-A to be passed through contact openings 16 of the configuration portions 12-1, 12-2 as shown in FIG. 1. The electrical contacts 6 are passed in z-direction through the contact openings 16 of the touch protection elements TPE and can be plugged into the aligned contact openings 4-*i* of the hybrid busbars 1-*i* covered by the touch protection elements TPE. By plugging or inserting the electrical contacts 6 of electrical devices ED-A into the contact-receiving rail profiles 3 of the hybrid busbars 1, an electrical and/or mechanical connection can be provided as also illustrated schematically in the cross section view of FIG. 21. The mechanical connection in x and y direction can be provided by contact protection ribs extending in parallel on both sides of an electrical contact 6. A mechanical connection in y-direction can be provided by slots 12A-1, 12A-2. As can be seen in FIG. 1, the touch protection elements TPE can comprise guiding or sliding means 32 which allow to move the configuration portions 12-1, 12-2 of the touch protection element in y-direction between two positions. In the illustrated embodiment of FIG. 1, the busbars 1-*i* are mounted in a horizontal direction on the busbar support elements 17-1, 17-2. The touch protection elements TPE1 to TPE5 can be snapped on the horizontal busbars 1-*i* by means of the busbar mounting hooks 23-*i* from above. As can be seen in FIG. 1, the touch protection elements TPE1 to TPE5 have a longitudinal shape to cover several parallel mounted busbars 1-*i*. In the illustrated exemplary embodiment of FIG. 1, each touch protection element TPE is adapted to cover and isolate three busbars 1-*i* mounted in parallel in x-direction. In the embodiment shown in FIG. 1, the touch protection elements TPE are mounted perpendicular on the hybrid busbars 1-*i*. In the illustrated example, the longitudinal axis of the touch protection elements TPE is in vertical direction (y-direction), i.e. perpendicular to the horizontal busbars 1 (x-direction). In the illustrated embodiment of FIG. 1, the guiding elements 32 allow to move the configuration portions 12-1, 12-2 in vertical direction (y-direction) between an upper position and a lower position. The configuration portions 12-1, 12-2 of the touch protection elements TPE1, TPE2 are in the lower position, whereas the configuration portions 12-1, 12-2 of the other touch protection elements TPE3, TPE4, TPE5 are in the upper position. In the lower first position, the configuration portions 12-1, 12-2 are both adapted to provide a configuration where protruding electrical contacts 6 of electrical devices ED can be passed in z-direction through the contact openings 16-*i* of the touch protection element TPE and can be plugged or inserted into aligned contact openings 4-*i* of contact-receiving rail profiles 3 of hybrid busbars 1-*i* covered by the touch protection element TPE. In contrast, if the configuration portions 12-1, 12-2 are moved or pushed to the other upper configuration position as is in the case for the touch protection elements TPE3, TPE4, TPE5, the respective touch protection element TPE is adapted to provide a second configuration where device mounting latches 7 of electrical devices ED can be passed in z-direction through the latch openings 11-*i* of the touch protection element TPE and can engage the hybrid busbars 1 and any other non-hybrid busbars covered by the touch protection element TPE from behind.

In the illustrated embodiment of FIG. 1, each touch protection element TPE comprises two configuration portions 12-1, 12-2. In the illustrated embodiment of FIG. 1, each configuration portion 12-1, 12-2 can be moved separately from the other configuration portion of the same touch protection element TPE between two configuration positions. In a possible embodiment, both configuration portions 12-1, 12-2 of the same touch protection element TPE can be mechanically coupled or connected so that if a first configuration portion 12-1 is moved or pushed to a specific configuration position, the other configuration portion 12-2 of the same touch protection element TPE is moved to the same configuration position as the coupled first configuration portion 12-1.

As can be seen in the embodiment of FIG. 1, a user or operator can manually move configuration portions 12-1, 12-2 of the different touch protection elements TPE individually between different configuration positions depending on the electrical devices ED which the user or operator wishes to connect to the touch protected busbar system TP-BSYS according to the present invention. For instance, an electrical device ED can either comprise device mounting latches 7 for contacting busbars or electrical contacts 6 for connecting busbars. If an electrical device ED comprises protruding electrical contacts 6 as illustrated in the cross section of FIG. 21, the operator can bring one or more touch protection elements TPE to a configuration position where the protruding electrical contacts 6 of the respective electrical device ED can be inserted into the contact openings 4-$i$ of the hybrid busbars 1-$i$. To do this, the operator will move the contact portions 12-1, 12-2 into the first configuration position as illustrated for the touch protection element TPE1 and TPE2 shown in FIG. 1. In contrast, if the electrical device ED to be connected to the touch protected busbar system TP-BSYS comprises for instance hook-shaped device mounting latches 7, the configuration portions 12-1, 12-2 of the respective touch protection elements TPE are moved by the user to the other second configuration position, where the device mounting latches 7 can be passed through the latch openings 11-$i$ of the electrical isolating touch protection elements TPE and can engage the hybrid busbars 1-$i$ or non-hybrid busbars covered by the touch protection elements TPE from behind. Accordingly, the user can in this case push manually the configuration portions 12-1, 12-2 to the upper position as illustrated in FIG. 1 for touch protection element TPE3, TPE4, TPE5.

As can be seen in the illustrated embodiment of FIG. 1, the hybrid busbars 1-$i$ are mounted on the busbar support elements 17A, 17B and are covered partially by five touch protection elements TPE1 to TPE5 wherein two of the touch protection elements TPE1, TPE2 are in a first configuration position for receiving a first type of electrical devices ED-A and the remaining touch protection elements TPE3, TPE4, TPE5 are in a second configuration position to connect another type of electrical devices ED-B of the touch protected busbar system TP-BSYS. The longitudinal touch protection elements TPE are mounted in vertical direction (y-direction) by means of busbar mounting hooks 23-$i$ to the hybrid and/or non-hybrid busbars, the touch protection element TPE is in a preferred embodiment symmetrical to its longitudinal axis having a mechanical slide or removal protection 30 at its lower end and at least one mechanical interface 31 at its upper end as also illustrated in FIG. 1. The electrical isolating touch protection element TPE comprises a mechanical slide protection 30 adapted to block an unwanted removal of the respective touch protection element TPE from the touch protected busbar system TP-BSYS. In a preferred embodiment, the mechanical slide protection 30 is releasable by a protection release tool. This protection release tool can comprise a screwdriver or a specific protection release tool. In an alternative embodiment, the mechanical slide protection 30 can also be constructed such that the mechanical slide protection is unreleasable. The mechanical removal protection 30 is located at the lower end of the vertical mounted touch protection element TPE as shown in FIG. 1. In case that the mechanical removal protection is releasable, the user or operator can use a general or specific slide protection release tool to unrelease the touch protection element TPE so that the touch protection element TPE can be slipped from the busbars.

The touch protection elements TPE can comprise one or more mechanical interfaces, in particular a mechanical interface 31 located at the upper end of the vertical mounted touch protection element TPE as shown in FIG. 1. The mechanical interface can serve different purposes. In a possible embodiment, the mechanical interfaces 31 allow to connect mechanical components with the touch protected busbar system TP-BSYS according to the present invention. These mechanical components connected via the mechanical interfaces 31 of the electrical isolating touch protection elements TPE to said touch protected busbar system TP-BSYS can comprise components to receive additional busbars used to carry electrical current and/or used to carry information or data. These additional busbars can be provided to carry electrical signals between electrical devices ED connected to the touch protected busbar system TP-BSYS according to the present invention. In a possible implementation, additional busbars can be used to provide a powerline communication PLC between the different electrical devices ED. The mechanical interfaces 31 can also be used to connect auxiliary components to the touch protected busbar system TP-BSYS, in particular auxiliary components used to label the respective touch protection elements TPE or the electrical devices ED connected at this position to the touch protected busbar system TP-BSYS.

In a possible embodiment, the electrical isolating touch protection elements TPE can also comprise slots 12A to receive protruding mechanical elements of electrical devices ED mounted on said touch protection elements TPE and being electrically connected to the hybrid busbars 1 and/or to the non-hybrid busbars covered by the respective touch protection elements TPE. As can be seen in FIG. 1, the first configuration portion 12-1 of each touch protection element TPE can comprise openings 12B-1 to receive coding protrusions of electrical devices ED to provide a reverse voltage protection of the electrical devices ED. Further, both configuration portions 12-1, 12-2 of each touch protection element TPE can comprise slots 12A-1, 12A-2 to receive mechanical locking elements of electrical devices ED-A used to mount the electrical devices ED-A on the touch protection elements TPE. The electrical isolating touch protection elements TPE such as illustrated in FIG. 1 can also be adapted to cover and isolate additional busbars and/or electrical conductors used to transport analog and/or digital information signals, AC or DC supply voltages to provide reference potentials for electrical or electronic devices. In the illustrated embodiment of FIG. 1, the busbars of the touch protected busbar system TP-BSYS are all formed by hybrid busbars 1-1, 1-2, 1-3. In a possible embodiment, the touch protected busbar system TP-BSYS can comprise longitudinal busbar connectors adapted to connect mechanically and electrically at least one non-hybrid busbar to one of the hybrid busbars 1-$i$ of the touch protected busbar system TP-BSYS.

The length of the busbars 1 mounted to the busbar support elements 17-1, 17-2 can vary depending on the use case.

Further, the geometry of a cross section of the hybrid busbars 1 can be different in different implementations. In a possible embodiment, each hybrid busbar 1 comprise at least one bounding geometry having a rectangular cross section engageable by hook-shaped mounting latches 7 of electrical devices ED or of electrical connectors or of electrical adapters to be connected to the touch protected busbar system TP-BSYS. The electrical isolating touch protection elements TPE such as touch protection elements TPE1 to TPE5 can provide in a possible embodiment an intrusion protection according to a protection marking code IP20B and/or provide also an interface for an additional protection element in order to achieve protection marking IP40D.

In a possible embodiment, the touch protected busbar system TP-BSYS as illustrated in FIG. 1 can also be integrated in a housing of a distribution box or of a distribution enclosure. In a possible embodiment, each busbar, in particular each hybrid busbar, can be provided for carrying an electrical supply phase L of a power supply.

In a possible embodiment, the touch protected busbar system TP-BSYS comprises at least one current-feeding component adapted to feed one or more electrical supply phases L to the hybrid or non-hybrid busbars covered by the touch protection elements TPE of the touch protected busbar system TP-BSYS. In the embodiment illustrated in FIG. 1, the touch protected busbar system TP-BSYS comprises three hybrid busbars 1-1, 1-2, 1-3 which can be used to carry three electrical power supply phases L1, L2, L3. The electrical devices ED mounted to the touch protected busbar system TP-BSYS can receive the electrical supply currents and/or electrical supply voltages by means of their electrical contacts 6 and/or by means of electrical contacts provided by contact tongues 28A of clamping elements 28 or by contact fingers of comb-shaped contact plates 22A of a clamping unit 22 as illustrated in FIG. 27. The electrical contacts of electrical device ED-B can also be provided at the hook-shaped device mounting latches 7 engaging the busbars from behind.

Figure 2:
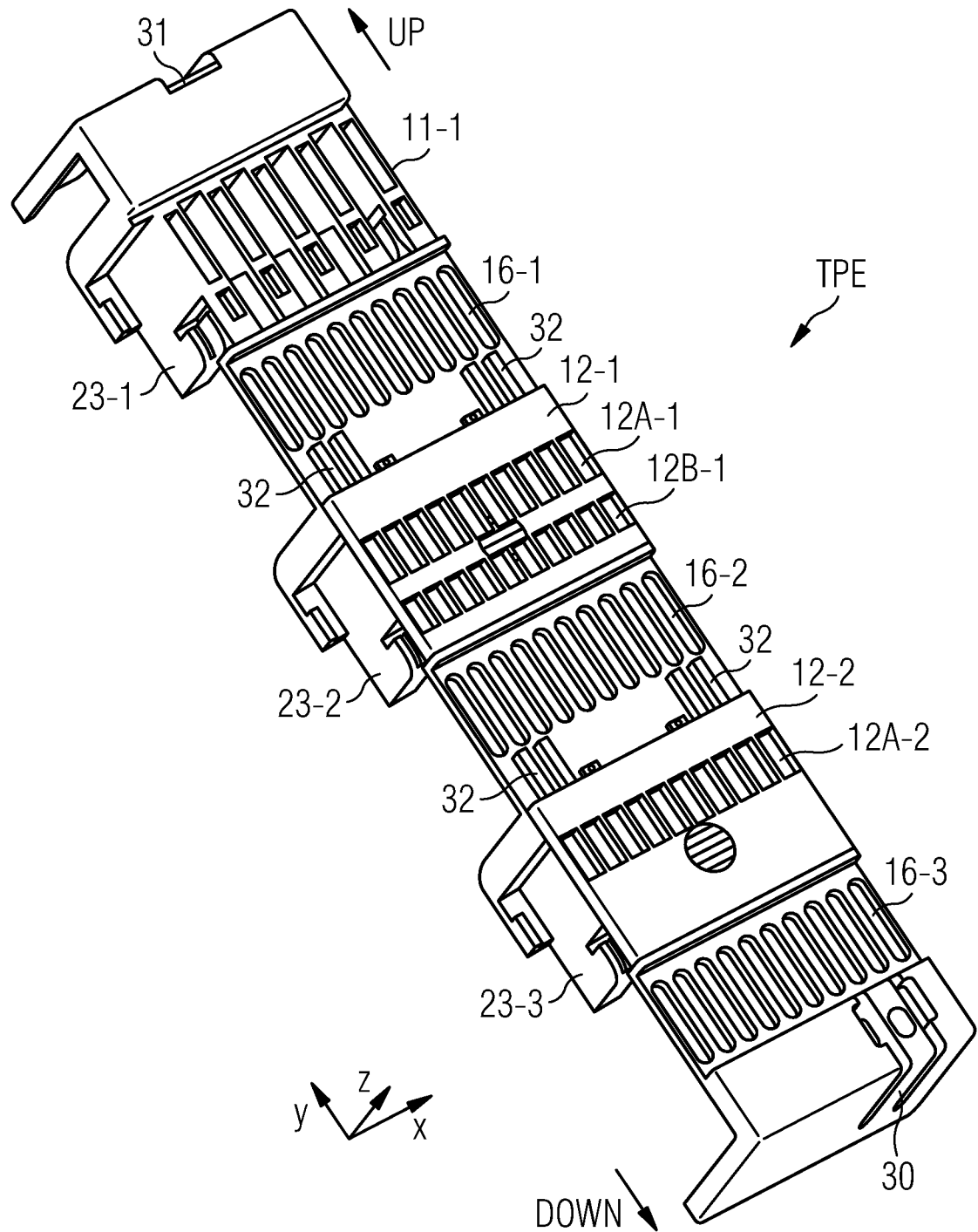
FIG. 2 shows a possible exemplary embodiment of a touch protection element as used by the touch protected busbar system illustrated in FIG. 1 wherein the electrical isolating touch protection element is in a first configuration position.

FIG. 2 shows an exemplary embodiment of a touch protection element TPE as used in the touch protected busbar system TP-BSYS according to the first aspect of the present invention. FIG. 2 illustrates the touch protection element TPE with its two configuration portions 12-1, 12-2 in a first lower configuration position where the contact openings 4-1, 4-2, 4-3 of all three parallel hybrid busbars 1-1, 1-2, 1-3 are accessible from the front side. In this first configuration position of the configuration portions 12-1, 12-2, the protruding electrical contacts 6 of electrical devices ED can be passed in z-direction through the contact openings 16 of the touch protection element TPE and can be plugged easily into the aligned contact openings 4-i of the hybrid busbars 1-i covered by the touch protection element TPE.

Figure 3:
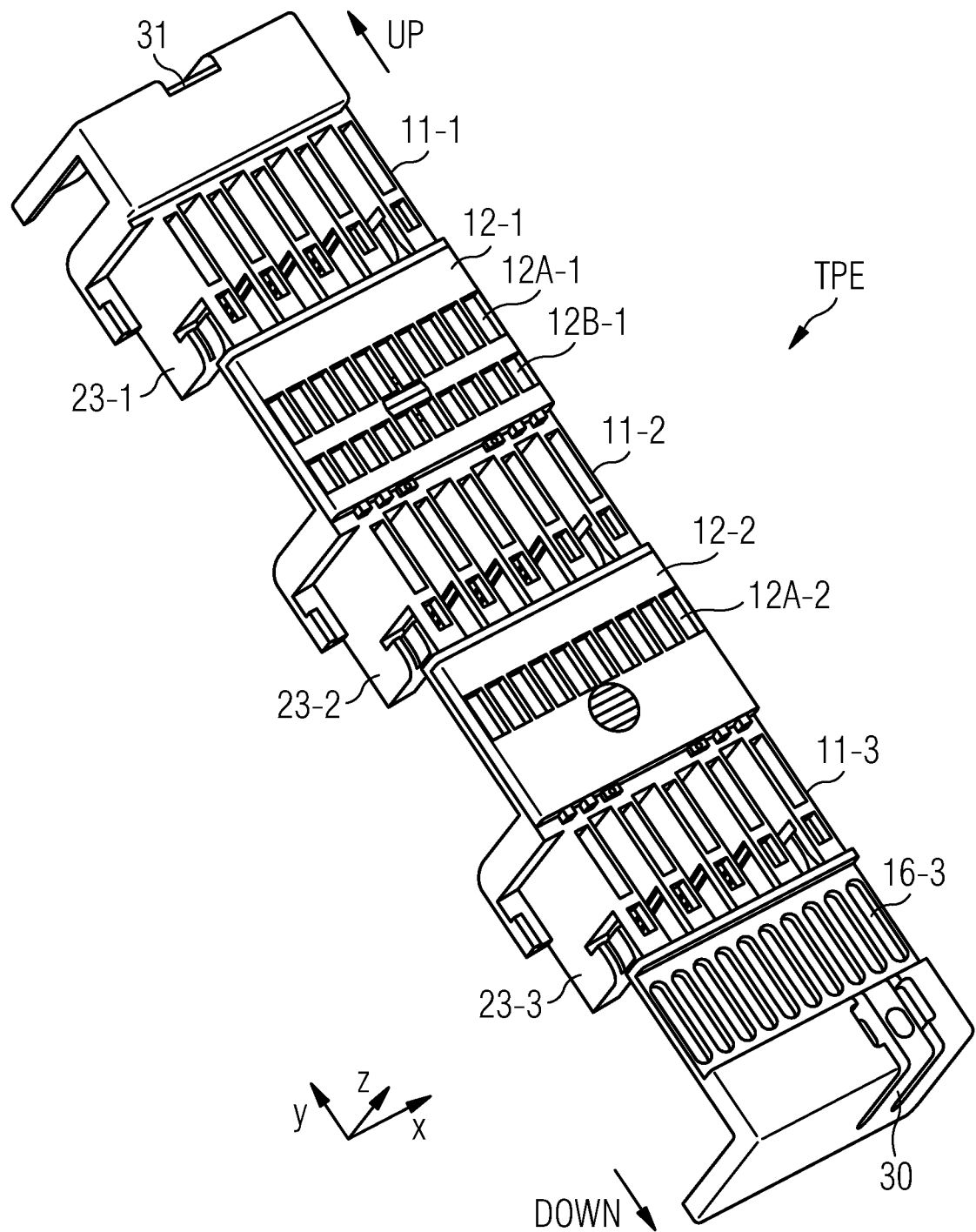
FIG. 3 shows the electrical isolating touch protection element as illustrated in FIG. 2 in another second configuration position.

FIG. 3 shows the touch protection element TPE of FIG. 2 in the other configuration position. As shown in FIG. 3, both configuration portions 12-1, 12-2 have been moved in the upper configuration position such as illustrated in FIG. 1 for a touch protection element TPE3, TPE4, TPE5. In this second configuration position (configuration portions moved to the upper position) the device mounting latches 7 of electrical devices ED can be passed through latch openings 11-1, 11-2, 11-3 of the respective touch protection element TBE and can engage the hybrid or non-hybrid busbars covered by the respective touch protection element TBE from behind. The slots can be used to establish an electrical contact by means of a comb-shaped contact plate 22A of a clamping unit 22 or by means of tongue-shaped contacts 28A of a clamping element 28 as illustrated in FIG. 27.

In the illustrated embodiments of FIGS. 2, 3, the touch protection element TBE is configured to cover three parallel busbars simultaneously when attached to the busbars by means of the busbar mounting hooks 23-1, 23-2, 23-3. In the illustrated embodiments, the touch protection elements TPE comprise three pairs of busbar mounting hooks 23-1, 23-2, 23-3, i.e. a total of six busbar mounting hooks. The busbar mounting hooks 23-i are configured and adapted to the cross section of the busbars to be covered by the touch protection element TPE. In a possible embodiment, the busbar mounting hooks 23-i can be slided or snapped on the busbars wherein the mechanical removal protection 30 at the lower side of the touch protection element TPE can be provided with hooks engaging the lower busbar 1-3 to block a removal of the touch protection element TPE from the busbars covered by the touch protection element TPE. In a possible preferred embodiment, the mechanical removal protection 30 can be released by means of a release tool allowing to remove the electrical isolating touch protection element TPE from the busbars 1. In the illustrated embodiment of FIGS. 2, 3, the touch protection element TPE comprises at the opposing upper side a mechanical interface 31 allowing to connect additional components to the touch protection element TPE. The provision of a mechanical slide protection 30 and the mechanical interface 31 is optional.

In the illustrated exemplary embodiments of FIGS. 2, 3, the configuration portions 12-1, 12-2 can be pushed or slided by means of sliding means 32 between a first configuration position and a second configuration position. In this embodiment, the configuration portion 12-1, 12-2 of the configurable electrical isolating touch protection element TPE is moved in y-direction between a first position to provide a first configuration and a second position to provide a second configuration.

In an alternative embodiment, at least one configuration portion 12-1, 12-2 of the configurable electrical isolated touch protection element TPE can be mounted or integrated with the electrical isolating touch protection element TPE in a fixed position to provide either a first configuration or a second configuration of the respective configurable touch protection element TPE.

In a still further possible alternative embodiment, an electrical isolating touch protection element TPE comprises a preconfigured touch protection element TPE. This preconfigured touch protection element TPE can provide a first configuration where protruding electrical contacts 6 of electrical devices ED can be passed through contact openings 16 of the respective preconfigured touch protection element TPE and can be plugged into aligned contact openings 4 of contact-receiving rail profiles 3 of hybrid busbars 1 covered by this preconfigured touch protection element TPE or providing a second configuration where device mounting latches 7 of electrical devices ED can be passed through latch openings 11 of the respective preconfigured touch protection element TPE and can engage hybrid busbars 1 or non-hybrid busbars covered by the preconfigured touch protection element TPE from behind. In this embodiment, the preconfigured touch protection element TPE does not comprise any movable configuration portions but is preconfigured and manufactured accordingly.

In a possible embodiment, the preconfigured touch protection element TPE can be manufactured by a configuration platform according to a further aspect of the present invention. This configuration platform can comprise a configuration module adapted to configure a touch protection element TPE in response to configuration data loaded from a database of the configuration platform and/or input via a user interface by a user into the configuration platform. A configuration module of such a configuration platform can be connected either via a local or a global data network to a manufacturing machine adapted to manufacture automatically the configured touch protection element TPE according to the configuration data. This manufacturing machine can comprise for instance a three-dimensional printer or an injection moulding machine.

In the illustrated embodiment of FIGS. 1, 2, 3 the electrical isolating touch protection elements TPE are used to connect electrical devices ED to the touch protected busbar system TP-BSYS. The electrical isolating touch protection element TPE can also comprise a preconfigured touch protection element TPE adapted to cover the parallel hybrid or non-hybrid busbars 1 in a section completely (not illustrated in FIG. 1). Accordingly, at a location where it is not intended to connect electrical devices ED to the touch protected busbar system such a preconfigured touch protection element TPE can be used to cover the parallel busbars at this location completely without providing any slots or latch openings. This provides more flexibility for configuring the complete system.

The grid of equally spaced contact openings 16-$i$ and the grid of equally spaced contact openings 4-$i$ are aligned to each other as illustrated in FIG. 1. The alignment of the contact openings 16-$i$ and the contact openings 4-$i$ makes it possible that the protruding electrical contacts 6 of electrical devices can be passed easily through a pair of aligned openings 4, 16. In a possible embodiment, the hybrid busbars 1 and/or non-hybrid busbars of the touch protected busbar system TP-BSYS can comprise centering cavities or centering protrusions which can be used for positioning precisely the touch protection elements TPE (in x-direction) at the right position (align position) to be mounted on the busbars of the touch protected busbar system TP-BSYS. Mechanical protrusions of touch protection element TPE at its lower side can snap into such centering cavities to facilitate the alignment of the touch protection element TPE with the underlying hybrid busbars 1 so that the contact openings 16 are aligned precisely and automatically with the underlying contact openings 4 of the covered hybrid busbars 1-$i$ in x-direction.

In the illustrated embodiment of FIG. 1, the busbars are covered in the center by five touch protection elements TPE1 to TPE5 which form separate individual mechanical components as illustrated in FIG. 2, FIG. 3. In a possible embodiment, several electrical isolating touch protection elements TPE can be integrated forming a front side electrical isolating touch protection panel 14A located at the front side of the touch protected busbar system TP-BSYS. This front side electrical isolating touch protection panel 14A can be connected in a possible embodiment with a rear side electrical isolating touch protection panel 14B provided at the rear side of the touch protected busbar system TP-BSYS to form an electrical isolating housing 13 encapsulating the busbars, i.e. the hybrid busbars 1 and/or non-hybrid busbars of the touch protected busbar system TP-BSYS completely as also visible in FIG. 4B.

Figure 31:
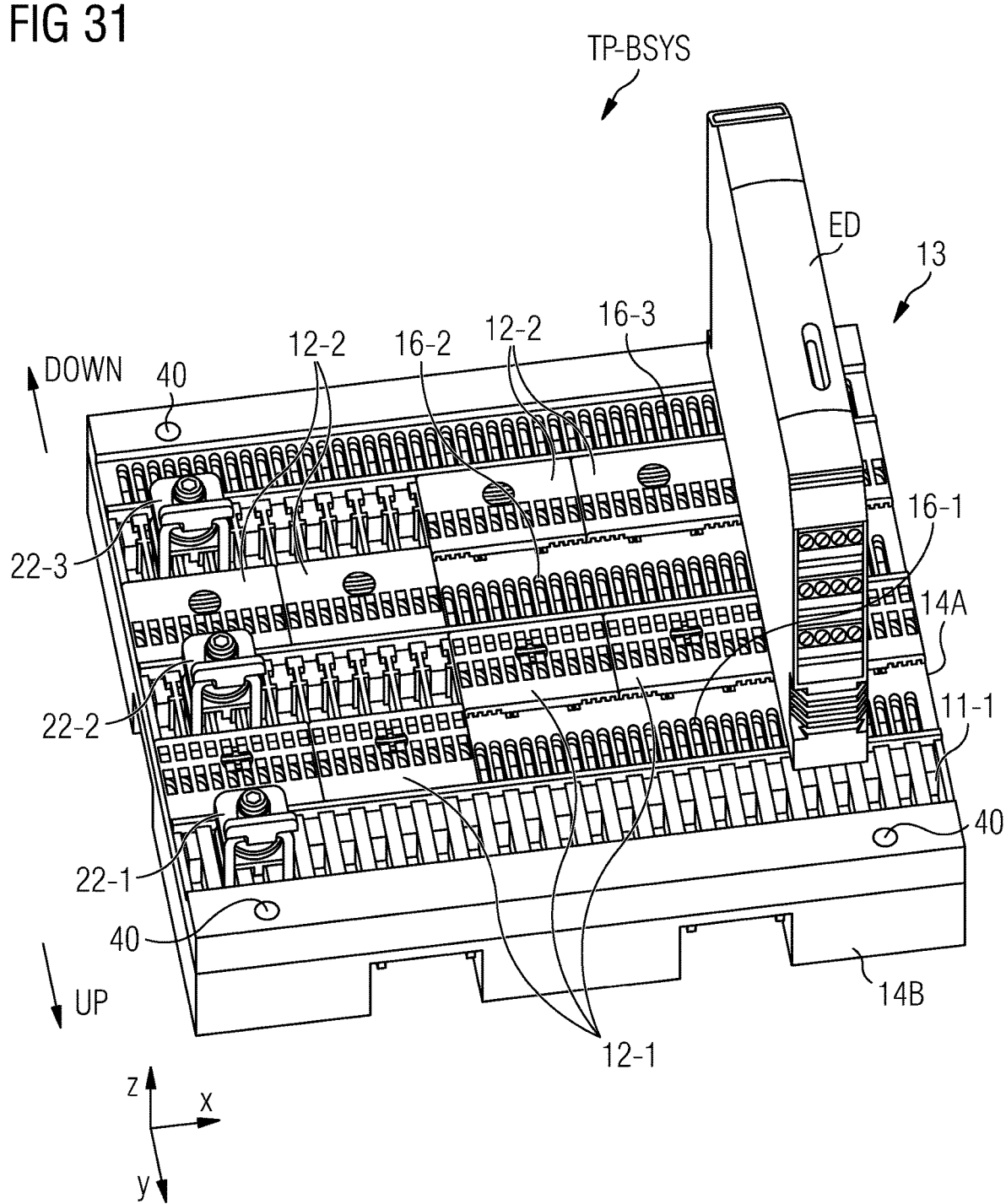
FIGS. 31, 32 show a further possible embodiment of a touch protected busbar system according to the present invention.
Figure 32:
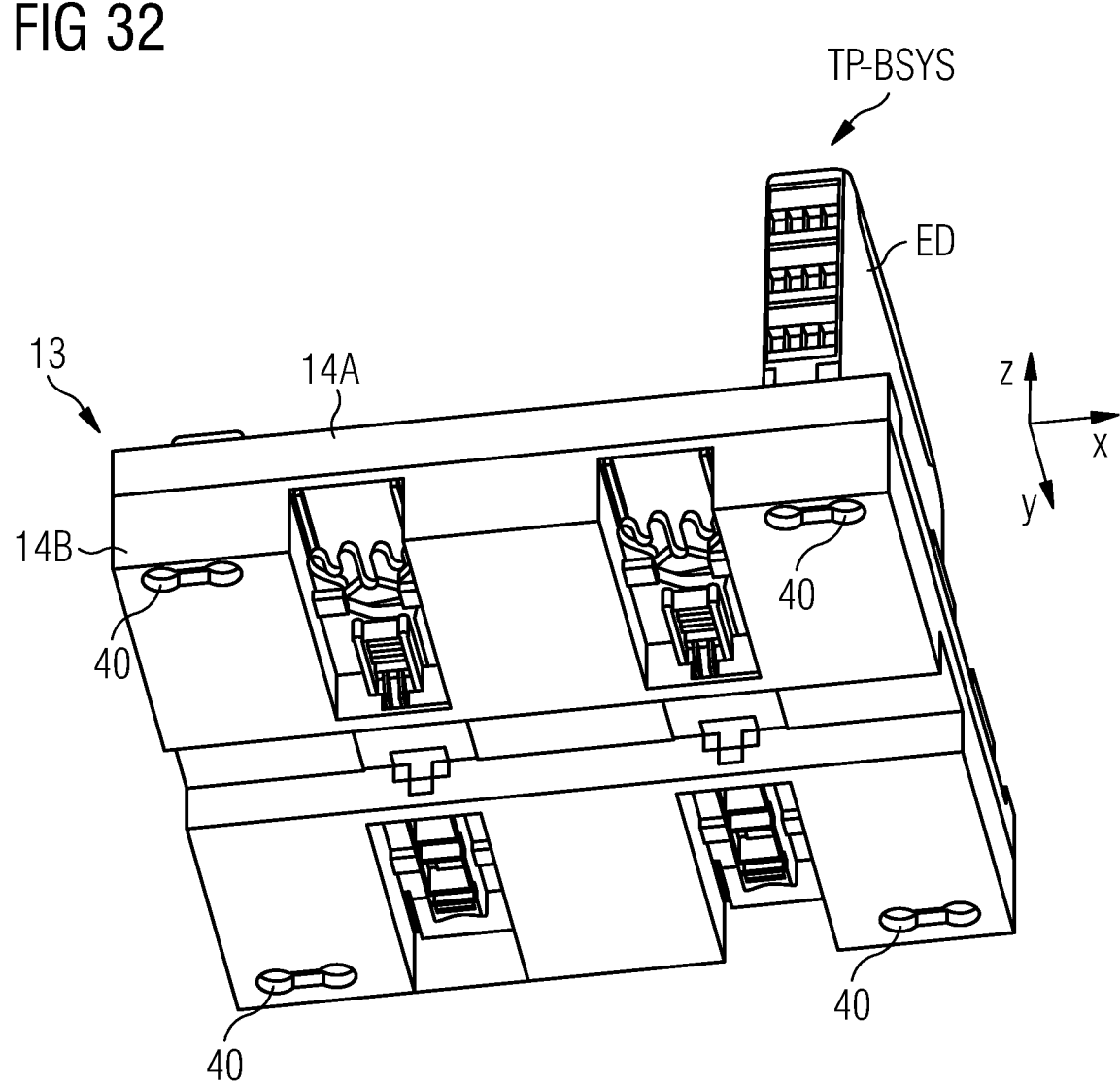

FIGS. 31 and 32 show a possible embodiment of a touch protected busbar system TP-BSYS with a front side electrical isolating touch protection panel 14A and a rear side touch protection panel 14B forming an electrical isolating housing 13 encapsulating the hybrid busbars 1 and/or any non-hybrid busbars completely. The busbar support elements BSE can be integrated in the rear side touch protection panel 14B of the housing 13. The out-of-the-box embodiment illustrated in FIGS. 31, 32 can be mounted on a mounting plate (not illustrated) e.g. by means of screws passing through screw holes 40 within the housing 13 as shown in FIGS. 31, 32.

Also, in the embodiment of FIG. 1 with separate protection elements TPE, an electrical isolating touch protection panel 14B can be mounted at the rear side of the touch protected busbar system TP-BSYS to provide encapsulations of the hybrid busbars 1 and/or non-hybrid busbars of the touch protected busbar system TP-BSYS thus increasing isolation protection of a user. The front side electrical isolating touch protection panel 14A as well as the rear side electrical isolating touch protection panel 14B can be manufactured of a fire-resistant and/or a heat-conducting plastic material. Both panels 14A, 14B can be made of a fire-resistant and heat-conducting transparent plastic material in a possible embodiment. In a possible embodiment, the front side electrical isolating touch protection panel 14A can be fabricated or manufactured by a manufacturing machine under control of a configuration platform according to configuration data loaded from a database or input via a user interface of the configuration platform. The preconfigured front side electrical isolating touch protection panel 14A covering the busbars at the front side of the touch protected busbar system TP-BSYS can comprise different sections including sections with configurable touch protection elements TPE such as illustrated in the embodiment of FIGS. 2, 3 with adaptable configuration portions and sections with preconfigured touch protection elements TPE having fixed configuration portions and also sections with touch protection elements TPE adapted to cover the hybrid busbars 1 completely, i.e. without any openings or slots.

FIGS. 4A, 4B show a view on a further exemplary embodiment of a touch protected busbar system TP-BSYS according to the first aspect of the present invention. In the illustrated example, the hybrid busbars 1 are covered by a set of touch protection elements TPE6 to TPE12. The touch protection elements TPE6 to TPE12 cover the hybrid busbars 1-1, 1-2, 1-3 partially, e.g. there is a section where the busbars 1-1, 1-2, 1-3 are not covered by any touch protection element TPE as shown in FIG. 4A. At this uncovered section, it is possible to plug in or insert electrical devices ED1, ED2 directly into the busbars 1 as shown in FIG. 4A. Accordingly, not all sections or portions of the busbar system have to be covered by touch protection elements TPE as shown in the configuration of FIG. 4A.

Further, electrical devices ED3, ED4, ED5 can be attached to the uncovered portion as illustrated in FIG. 4B so that the busbars become completely encapsulated. The front side can be covered by a mix of touch protection elements TPE (TPE6-TPE12) and electrical devices (ED1-ED5) as illustrated in FIG. 4B. The rear side can be covered by a rear side panel 14B as also illustrated in FIG. 4B. Alternatively, the front side can also be covered completely by touch protection elements TPE to form a front side panel 14A.

Further, it is possible to connect an adapter device 33 to a touch protection element such as the touch protection element TPE7 as shown in the perspective view of FIG. 4. This adapter element 33 can comprise a rail element to attach an electrical device ED to the system. Electrical current lines 34-1, 34-2, 34-3 can be connected by means of the adapter device 33 to the touch protected busbar system TP-BSYS as shown in the embodiment of FIGS. 4A, 4B. In the illustrated embodiment of FIGS. 4A, 4B, touch protection elements TPE6, TPE7, TPE8 are in the first lower configuration position uncovering the contact openings 16 and the underlying contact openings 4 so that protruding electrical contacts 6 of the adapter device 33 can be inserted or plugged into the contact openings 4 of the hybrid busbars 1-$i$. The electrical lines 34-1, 34-2, 34-3 can be electrically connected by corresponding electrical contacts 6 to corresponding hybrid busbars 1-1, 1-2, 1-3.

In the illustrated embodiment of FIGS. 4A, 4B, the remaining touch protection elements TPE9, TPE10, TPE10, TPE11, TPE12 are in the second upper configuration position where the contact openings 16-1, 16-2 are covered but a grid of latch openings 11-2, 11-3 remains uncovered as shown in FIG. 4A. As can be seen in FIG. 4A, clamping units 22-1, 22-2, 22-3 can be connected mechanically by means of the latch openings 11-1, 11-2, 11-3 to the touch protected busbar system TP-BSYS as also illustrated in more detail in FIG. 27. The clamping units 22-$i$ can be used to clamp electrical devices ED-B or other components, in particular electrically conducting components, to the hybrid busbars 1 of the touch protected busbar system TP-BSYS. The clamping units 22-$i$ can be integrated in electrical devices ED or adapter devices. As can be seen in FIG. 4A, the busbar support elements 17-1, 17-2, 17-3 can all be covered completely by electrical devices ED so that no space is wasted. This can be achieved by the specific T-I form of the current-carrying rail profile 2 as illustrated in FIGS. 4A, 4B. The busbar support element 17 embraces the hybrid busbars 1 beneath the electrical devices ED.

Figure 5:
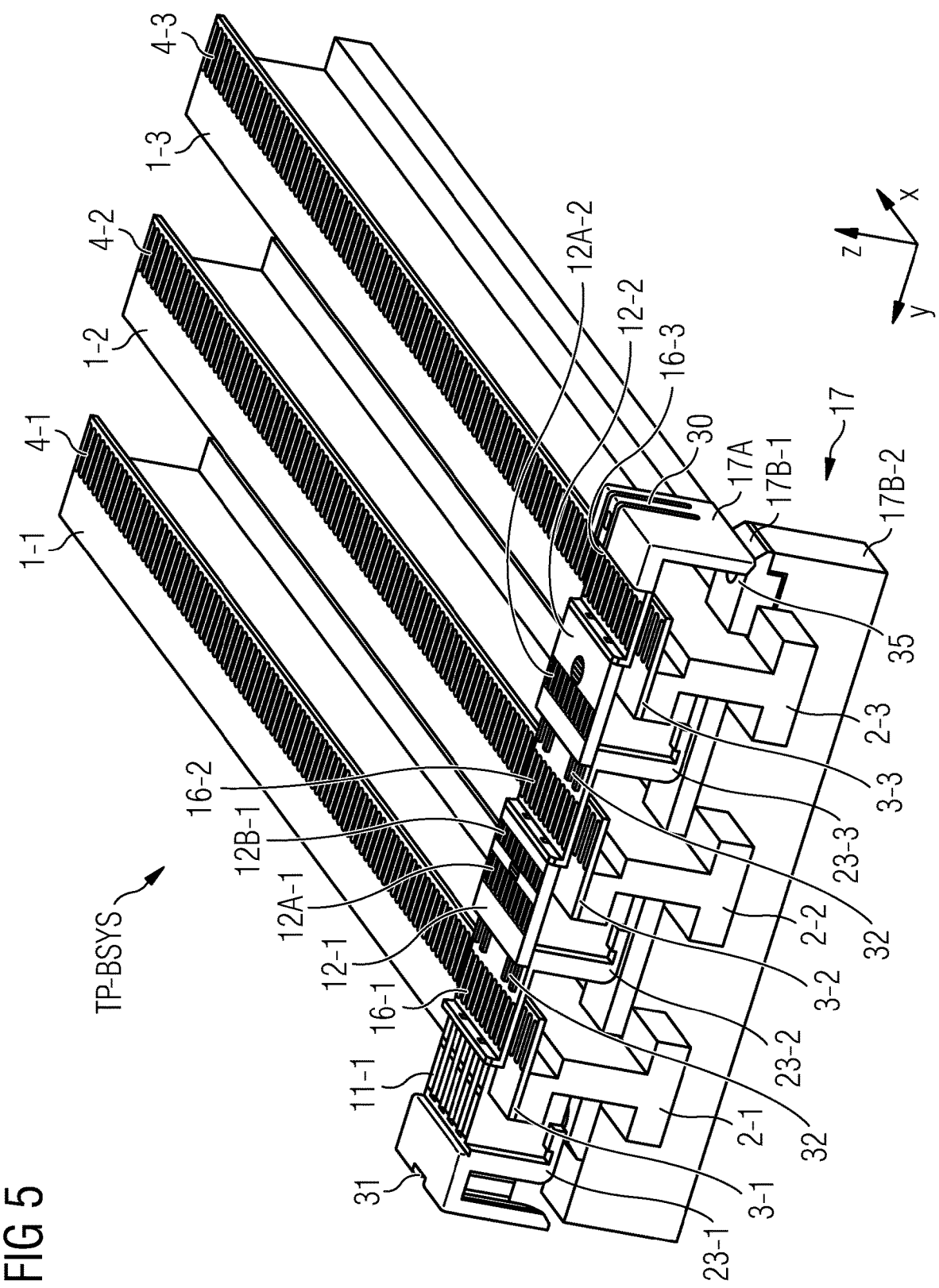
FIG. 5 shows a view on a busbar support element of an exemplary embodiment of a touch protected busbar system according to the first aspect of the present invention, wherein the busbar support element can be completely covered by attached electrical devices having either pluggable protruding electrical contacts or clamping contacts.
Figure 22:
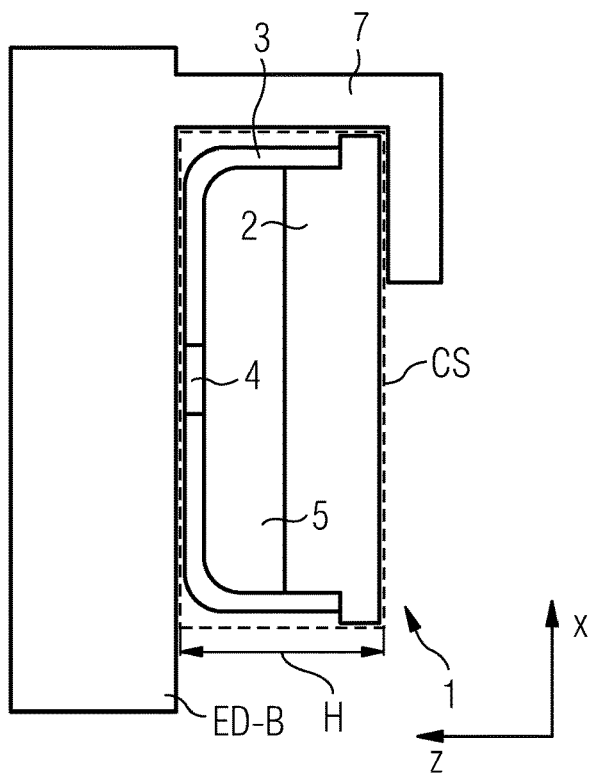

FIG. 5 shows a further view on a touch protected busbar system TP-BSYS according to the first aspect of the present invention. The busbar support element 17 illustrated in FIG. 5 can be completely covered by attached electrical devices ED. These electrical devices ED can comprise either electrical devices ED-A with protruding pluggable electrical contacts 6 as illustrated in FIG. 21 or may be attached by means of hook-shaped device mounting latches 7 as illustrated in FIG. 22 and being equipped with clamping contacts as illustrated in FIG. 27. As can be seen from the perspective view of FIG. 5, the hybrid busbars 1 can comprise in a possible implementation a T-shaped current-carrying rail profile 2 to which a flat contact-receiving rail profile 3 is attached. In the illustrated embodiment, three parallel hybrid busbars 1-1, 1-2, 1-3 comprise associated T-shaped current-carrying rail profiles 2-1, 2-2, 2-3 which can comprise a cross section allowing to carry a high electrical current. In the illustrated example, a touch protection element TPE can be mounted to the parallel hybrid busbars 1-$i$ to provide electrical protection. The busbar mounting hooks 23-$i$ of the touch protection element TPE can engage the current-carrying rail profile 2-$i$ from behind as shown in FIG. 5. The cross section of the current-carrying rail profile 2-$i$ can match the form of the busbar mounting hook 23-$i$ allowing to attach and snap the touch protection element TPE on the respective busbar. The T-shaped current-carrying rail profiles 2-$i$ of the busbars can be supported in the illustrated embodiment by a corresponding busbar supporting element 17. The busbar supporting element 17 comprises a basic lower supporting element 17A and an upper supporting element 17B holding the T-shaped hybrid busbars 1-$i$ from both sides as illustrated in FIG. 5. The touch protection element TPE illustrated in FIG. 5 can be formed such that it covers the hybrid busbars 1 at the location or section of the busbar supporting element 17 so that no room is wasted for connecting electrical devices ED to the touch protected busbar system TP-BSYS. The busbar supporting element 17 comprises busbar support fixing parts 17B-1 which can be mechanically fixed to the busbar support basic element 17B-2 holding the hybrid busbars 1-$i$ in a fixed position.

Figure 6B:
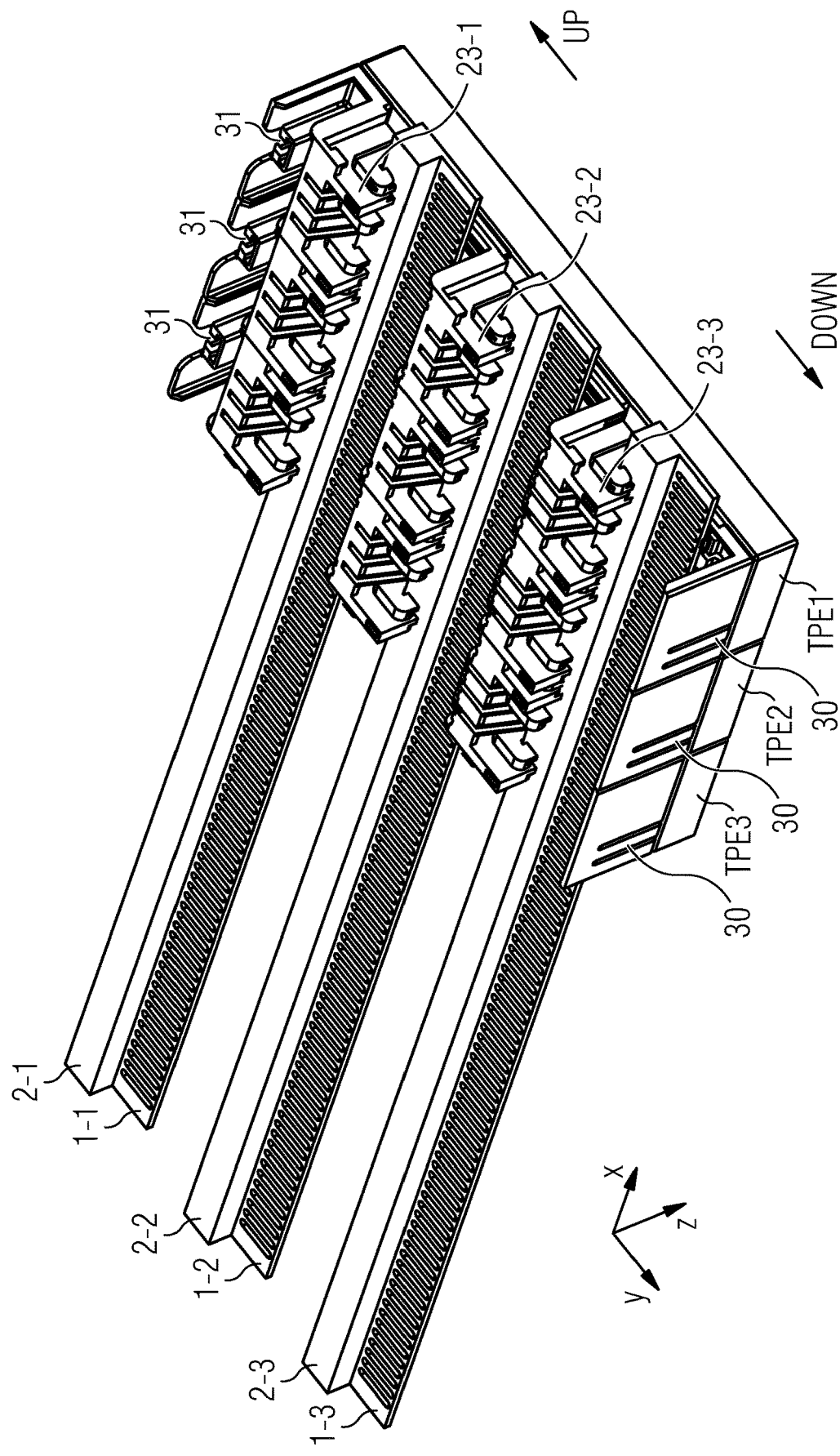

FIGS. 6A, 6B show a further view on a possible exemplary embodiment of a touch protected busbar system TP-BSYS according to an aspect of the present invention. In the illustrated example, a bottom element 37 provided for an electrical device ED to be attached to a touch protection element TPE1. The neighbouring touch protection elements TPE2, TPE3 are both in the second upper configuration position as illustrated in FIG. 3 to receive electrical devices ED having device mounting latches 7 passed through the latch openings 11-1, 11-2, 11-3 to engage the hybrid busbars 1-1, 1-2, 1-3 from behind. The bottom element 37 can comprise device latches 7 made of a fire-resistant and heat-conducting plastic material.

The bottom element 37 can comprise mechanical engaging elements 37A as illustrated schematically in FIG. 6A. The mechanically engaging elements 37A can be moved in z-direction through corresponding openings 37B at the lower rim of the touch protection elements TPE to engage into corresponding cavities 39 (shown in FIGS. 29, 30). The mechanical engaging elements 37A locked in the cavities 39 can be released in a possible embodiment by a release mechanism to disengage the electrical device ED from the touch protected busbar system TP-BSYS. FIG. 6A also shows schematically spring contacts 37C for the respective electrical device ED to provide an electrical connection with the underlying busbars 1 covered by the touch protection elements TPE.

FIG. 6B illustrates the mechanical attachment of the touch protection elements TPE1, TPE2, TPE3 to the hybrid busbars 1-1, 1-2, 1-3 by means of busbar mounting hooks 23-1, 23-2, 23-3.

Figure 7:
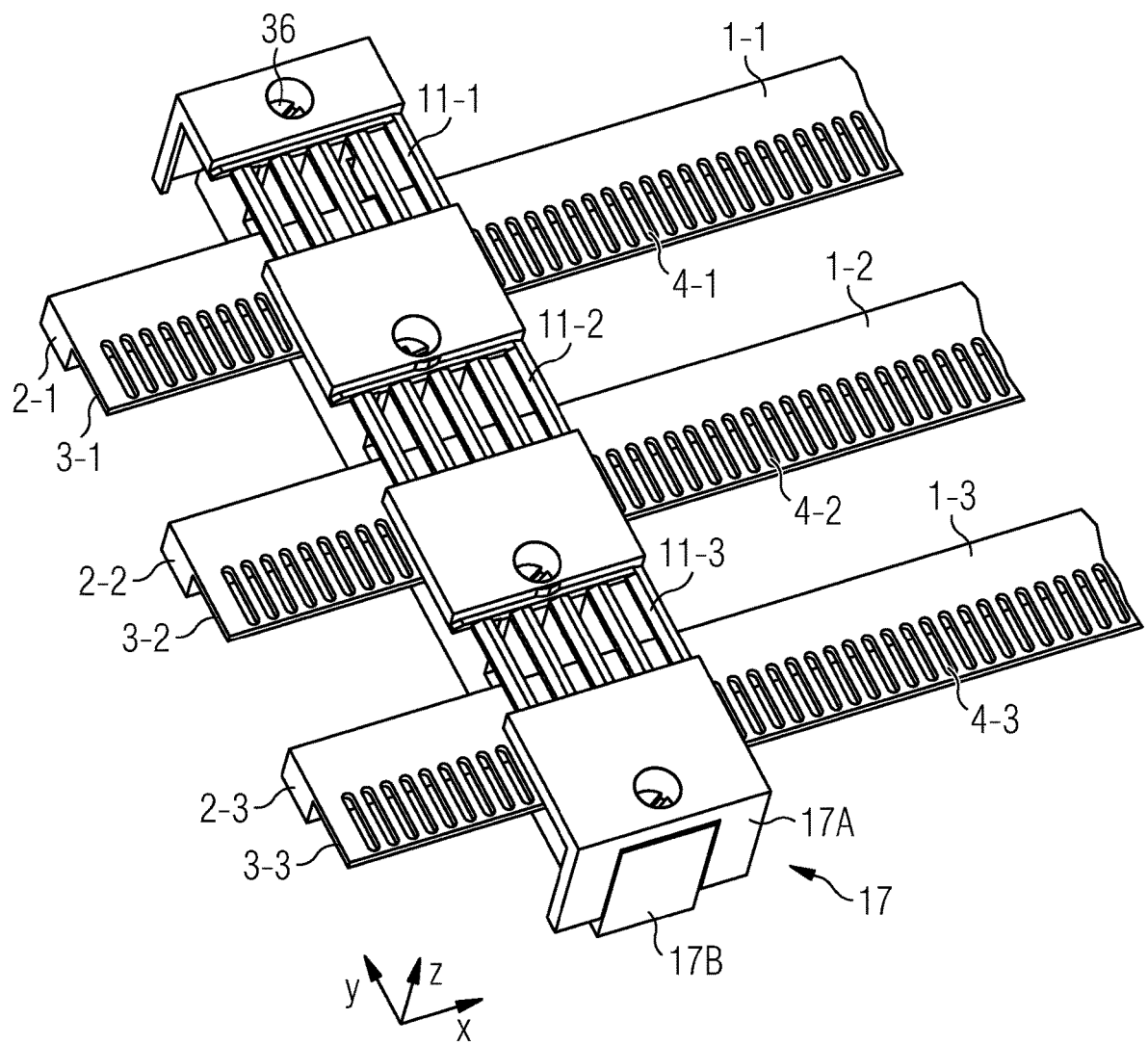
FIG. 7 shows a further view on an exemplary embodiment of a busbar support element which can be used in a touch protected busbar system according to the first aspect of the present invention allowing to mount electrical devices having device mounting latches.

FIG. 7 illustrates an exemplary embodiment of a busbar support element 17 which is preconfigured to comprise only latch openings 11-1, 11-2, 11-3 but no contact openings 16. Accordingly, this preconfigured busbar supporting element 17 can only be used for connecting electrical devices ED-B having device mounting latches 7 as shown in FIG. 22 which can be passed through the latch openings 11-$i$ of the busbar supporting element 17 to engage hybrid or non-hybrid busbars covered by the touch protection element TPE from behind. The electrical device ED-B can comprise clamp contacts as illustrated in FIG. 27 to establish an electrical contact with the hybrid busbars 1-$i$ carried by the busbar support element 17 of FIG. 7.

Figure 8:
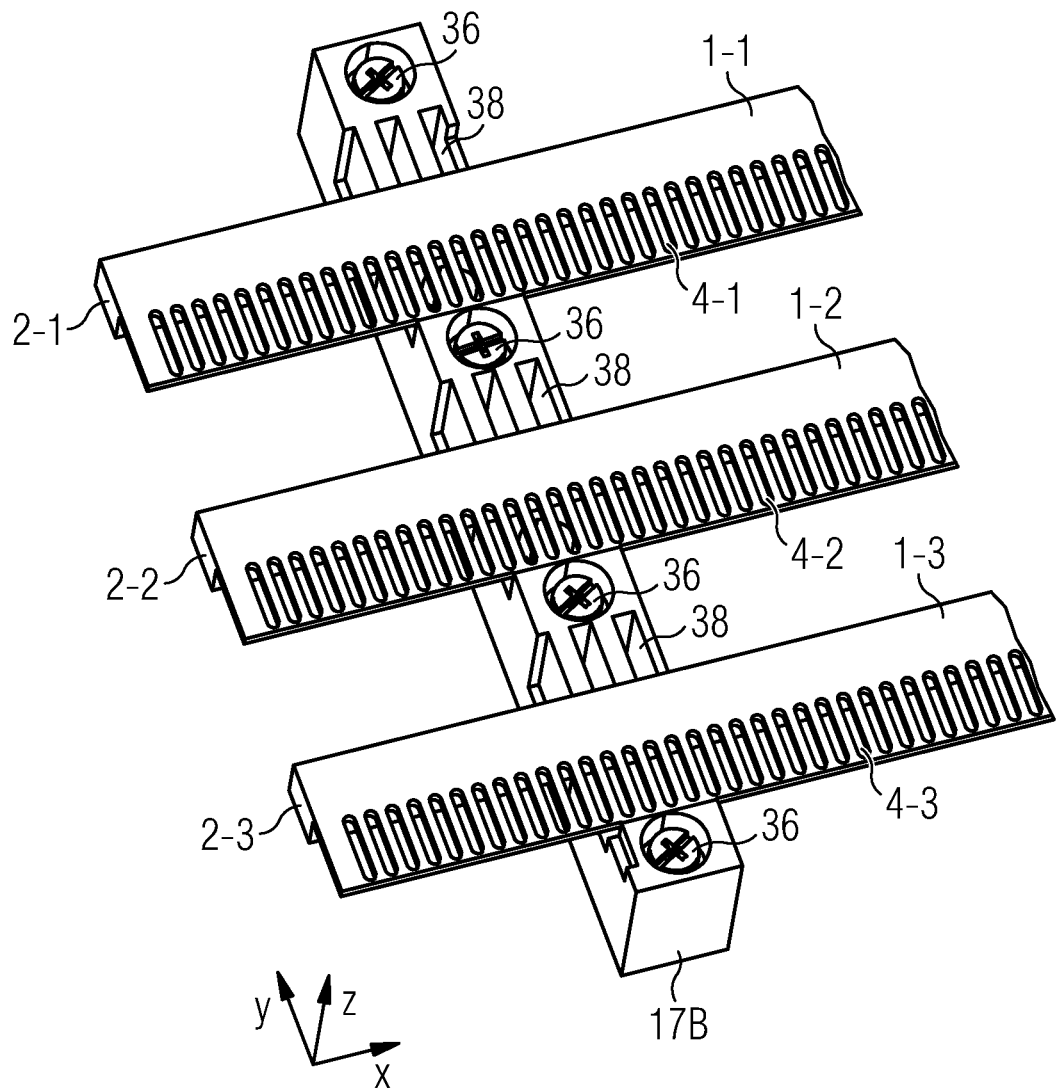
FIG. 8 illustrates assembling of hybrid busbars by using the busbar support element of FIG. 7 without the front element in a possible exemplary embodiment of a touch protected busbar system according to an aspect of the present invention.

FIG. 8 shows a busbar support element 17 adapted to receive the hybrid busbars 1-1, 1-2, 1-3 covered by the touch protection front element 17A illustrated in FIG. 7. The basic busbar support element 17B of FIG. 8 comprises cavings or receiving portions 38 adapted to receive mounting latches 7 of electrical devices ED-B passed through the latch openings 11-$i$ of a touch protection front element 17A of the busbar support element 17 to engage the current-carrying rail profiles 2-$i$ of the hybrid busbars 1-$i$ supported by the lower busbar support element 17B from behind.

Figure 9:
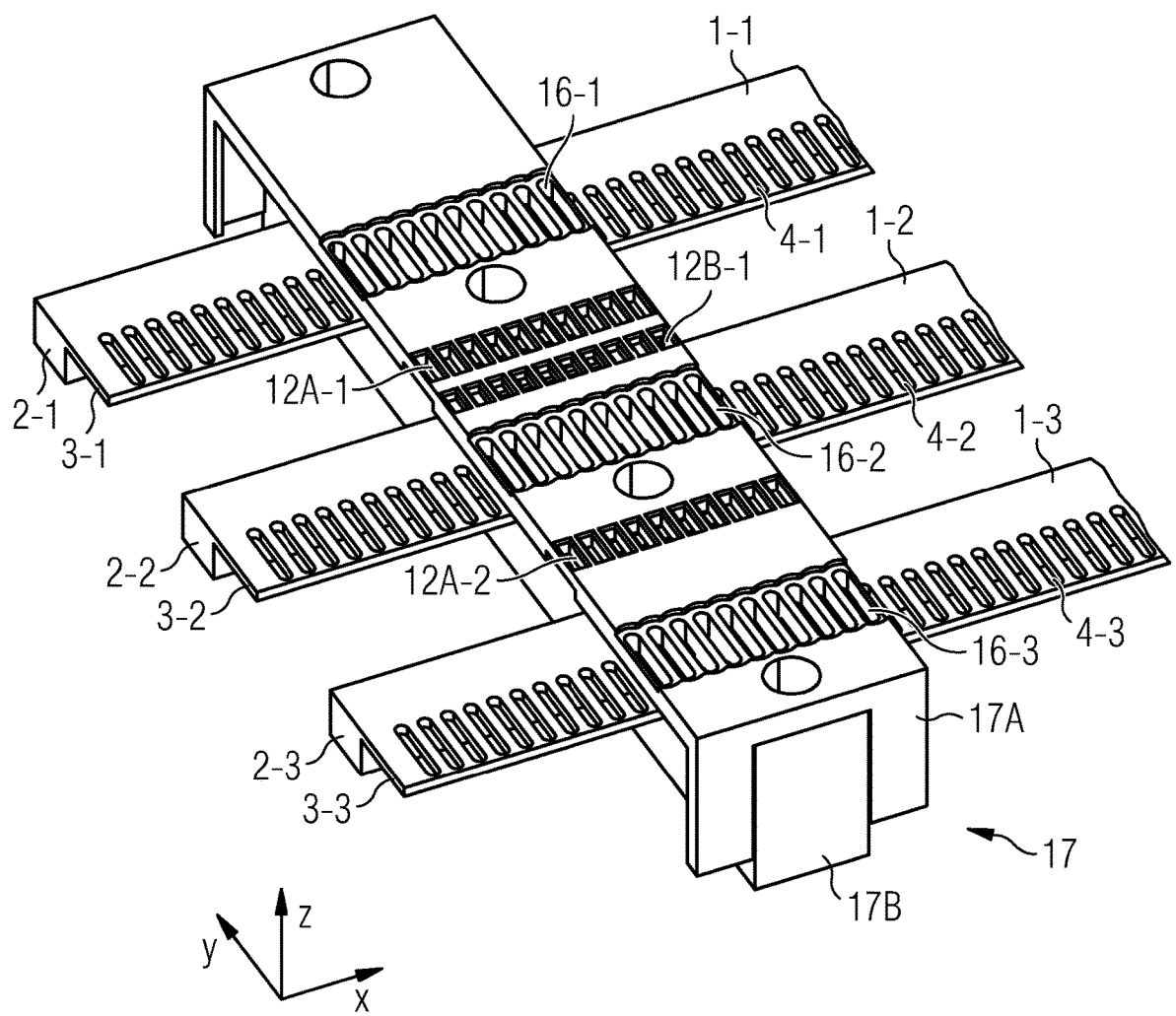
FIG. 9 illustrates a possible exemplary embodiment of a busbar support element which can be used in a touch protected busbar system according to the first aspect of the present invention allowing to mount electrical devices with protruding electrical contacts on top of the busbar supporting element.

FIG. 9 shows a further embodiment of a busbar support element 17 which can be used in the touch protected busbar system TP-BSYS according to the present invention. In the illustrated embodiment, the busbar support element 17 is preconfigured and manufactured to provide the first configuration, i.e. a configuration where electrical contacts 6 of electrical devices ED-A can be passed through contact openings 16-1, 16-2, 16-3 of the busbar support element 17 and can be plugged directly into the underlying aligned contact openings 4 of the contact opening grids 4-1, 4-2, 4-3 of contact-receiving rail profiles 3-1, 3-2, 3-3 of the hybrid busbars 1-1, 1-2, 1-3 covered by the busbar support element 17 shown in FIG. 9. The preconfigured busbar support element 17 of FIG. 9 can only be used for electrical devices ED-A having protruding electrical contacts 6 and not for electrical devices ED-B having device mounting latches 7 since the busbar support element 17 shown in FIG. 9 does not provide any latch openings 11 to receive device mounting latches 7.

Figure 10:
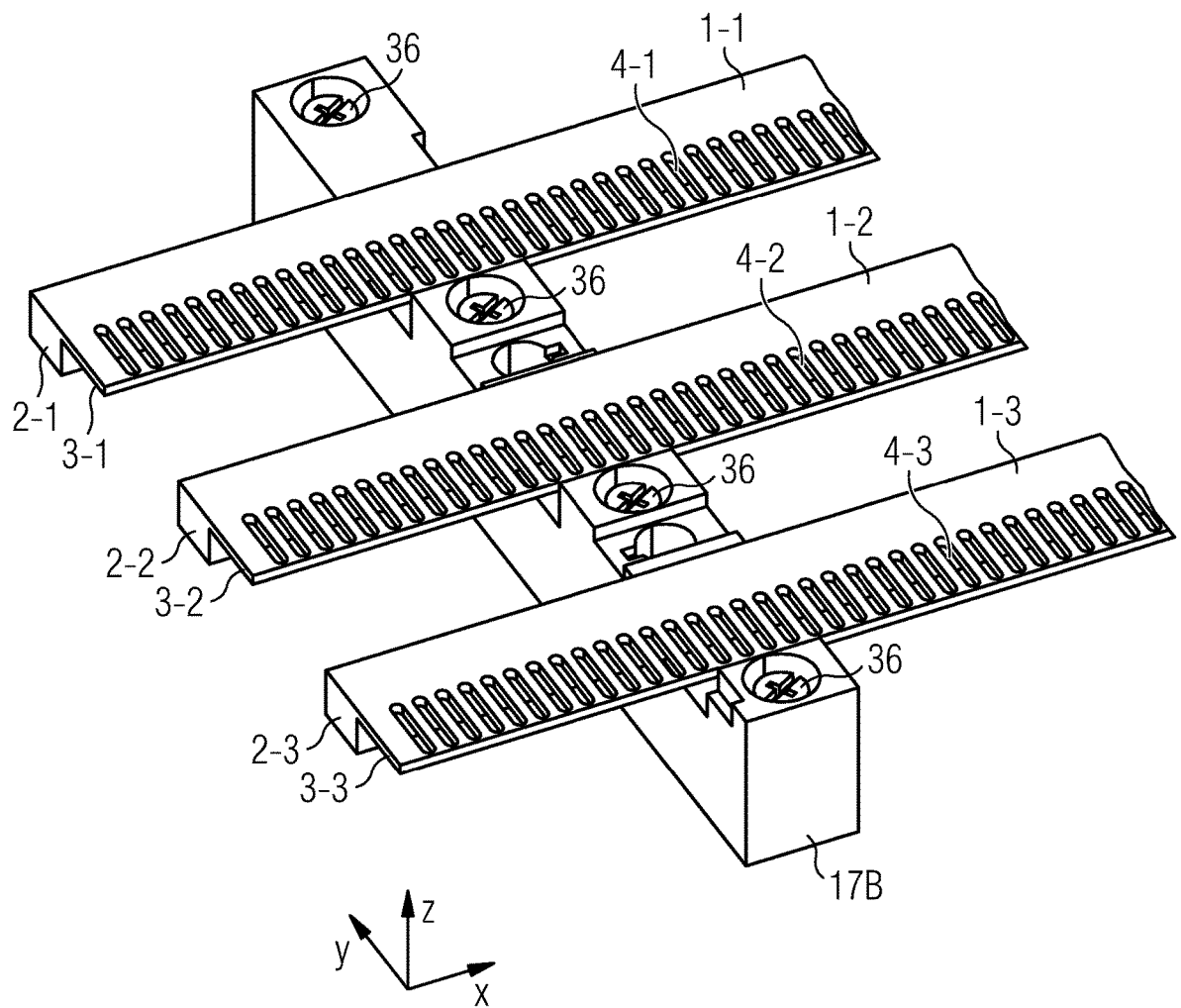
FIG. 10 illustrates a mounting of hybrid busbars to the busbar supporting element shown in FIG. 9 without the front element.

FIG. 10 shows the busbar supporting element 17 for receiving the hybrid busbars 1-1, 1-2, 1-3 shown in FIG. 9 without the touch protecting front element 17A. As can be seen in FIG. 10, the lower busbar support element 17B does not comprise openings 38 to receive device mounting latches 7 in contrast to the busbar supporting element 17 illustrated in FIG. 8.

FIGS. 11 to 20 show different exemplary embodiments (symmetrical or asymmetrical) of hybrid busbars 1 which can be used in a touch protected busbar system TP-BSYS according to the present invention. The hybrid busbars 1 comprise an outer boundary cross section CS (as shown in FIG. 22) corresponding to the cross section of a conventional massive busbar. This allows to provide a mixed assembly having both conventional busbars and hybrid busbars 1 in the same busbar system.

Figure 11:
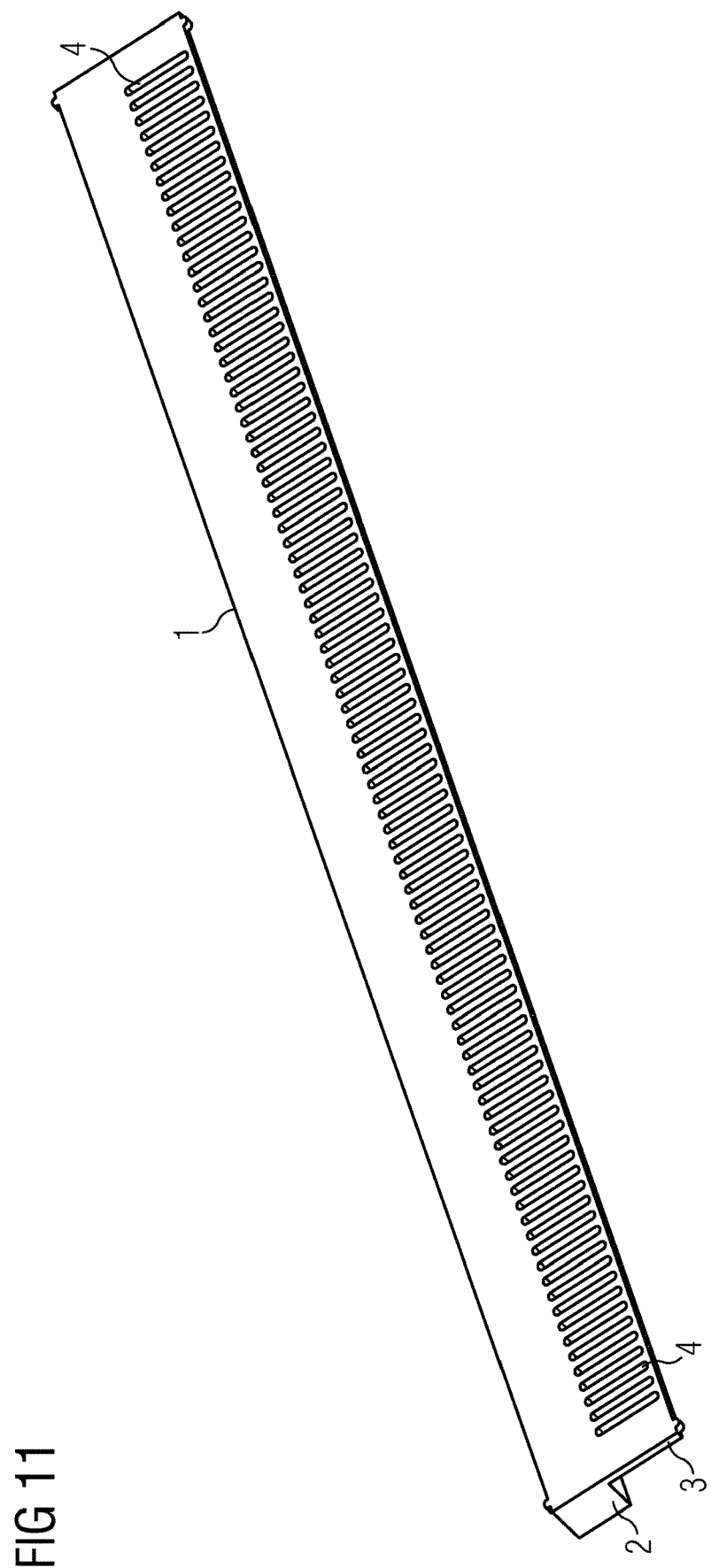
FIGS. 11 to 20 illustrate different possible exemplary embodiments of hybrid busbars which can be used in a touch protected busbar system according to the first aspect of the present invention.

FIG. 11 illustrates an exemplary asymmetrical embodiment of a hybrid busbar 1 being an integrated monolithic hybrid busbar having a current-carrying rail profile portion 2 and an integrated contact-receiving rail profile 3 with contact openings 4. The contact openings 4 are equally spaced and configured to receive corresponding protruding electrical contacts 6 of electrical devices to be connected to the touch protected busbar system TP-BSYS. As can be seen in FIG. 11, the hybrid busbar 1 is formed asymmetrically where the contact-receiving rail portion 3 is attached lateral to the current-carrying rail profile portion 2.

Figure 12:
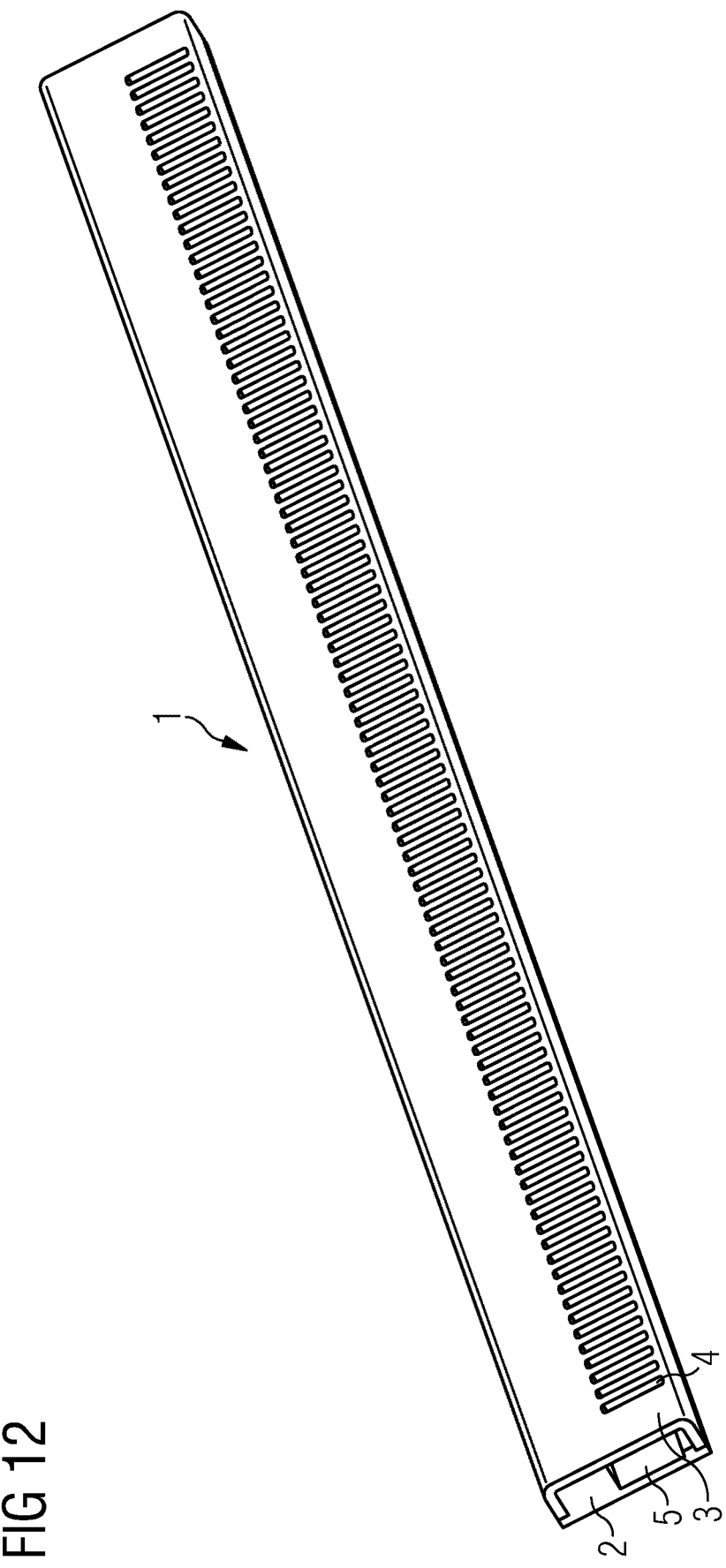

FIG. 12 shows a further exemplary asymmetrical embodiment of a hybrid busbar 1 which can be employed in a touch protected busbar system TP-BSYS according to the present invention. In the illustrated embodiment, the hybrid busbar 1 comprises two separate components which are mechanically attached to each other. In the illustrated embodiment, the contact-receiving rail profile 3 is attached to a current-carrying rail profile 2. An empty space 5 remains to receive the protruding electrical contacts 6 of a connected electrical device ED. In the embodiment illustrated in FIG. 12, the hybrid busbar 1 is also formed asymmetrically. The contact-receiving openings 4 are equally spaced in x-direction and form a grid to receive electrical contacts 6 wherein the electrical openings 4 are located in the lower half section of the hybrid busbar 1 as illustrated in FIG. 12. The contact-receiving rail profile 3 is not flat as in FIG. 13 but is U-shaped to cover the underlying current-carrying rail profile 2.

Figure 13:
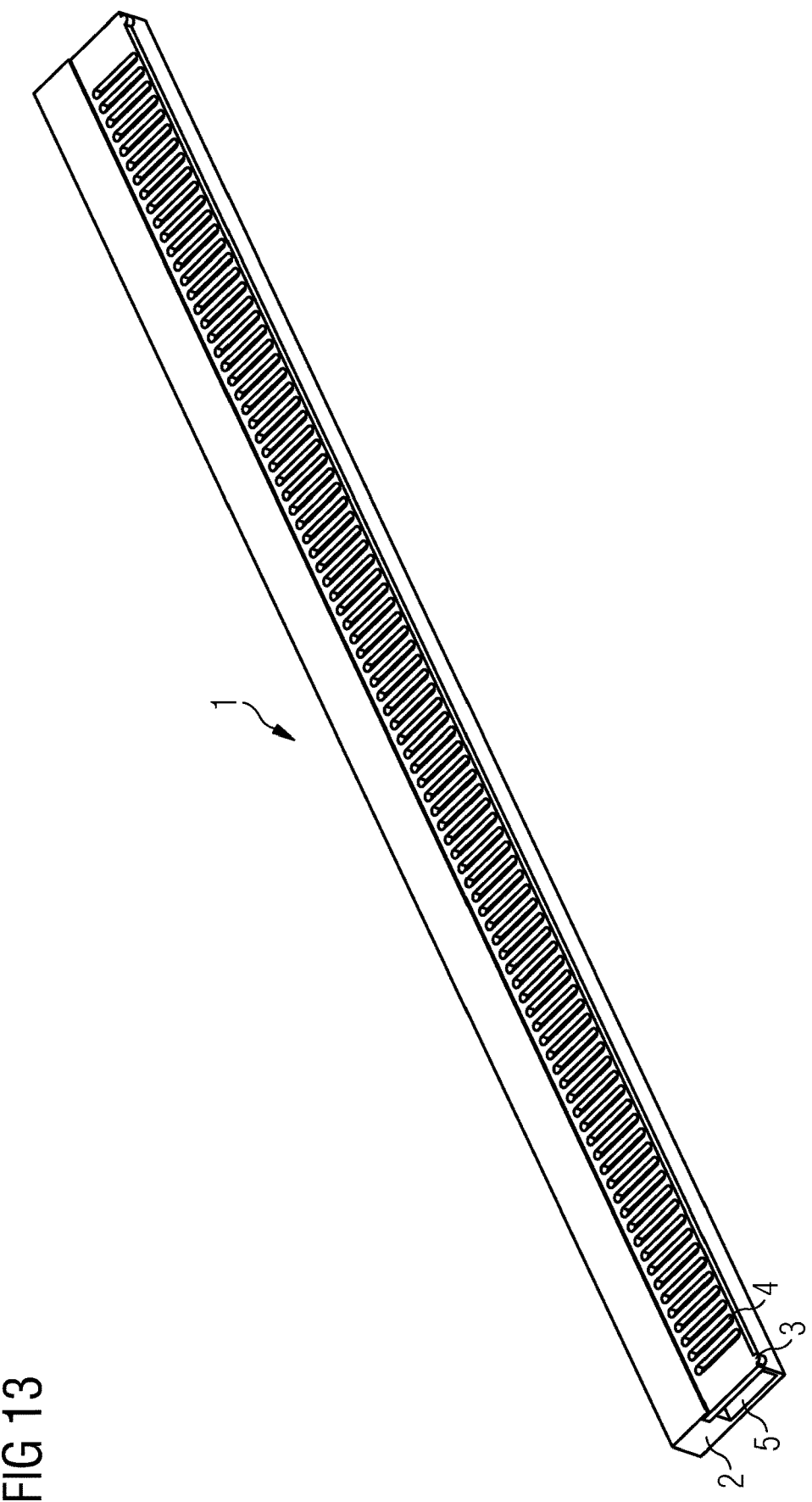

FIG. 13 illustrates a further exemplary asymmetrical embodiment of a hybrid busbar 1 which can be used in a touch protected busbar system TP-BSYS according to the present invention. In the illustrated exemplary embodiment of FIG. 13, the contact-receiving rail profile 3 is a flat mechanical component attached to the underlying current-carrying rail profile 2. In the embodiment of FIG. 13, the hybrid busbar 1 is formed asymmetrically along its longitudinal axis (x-direction).

Figure 14:
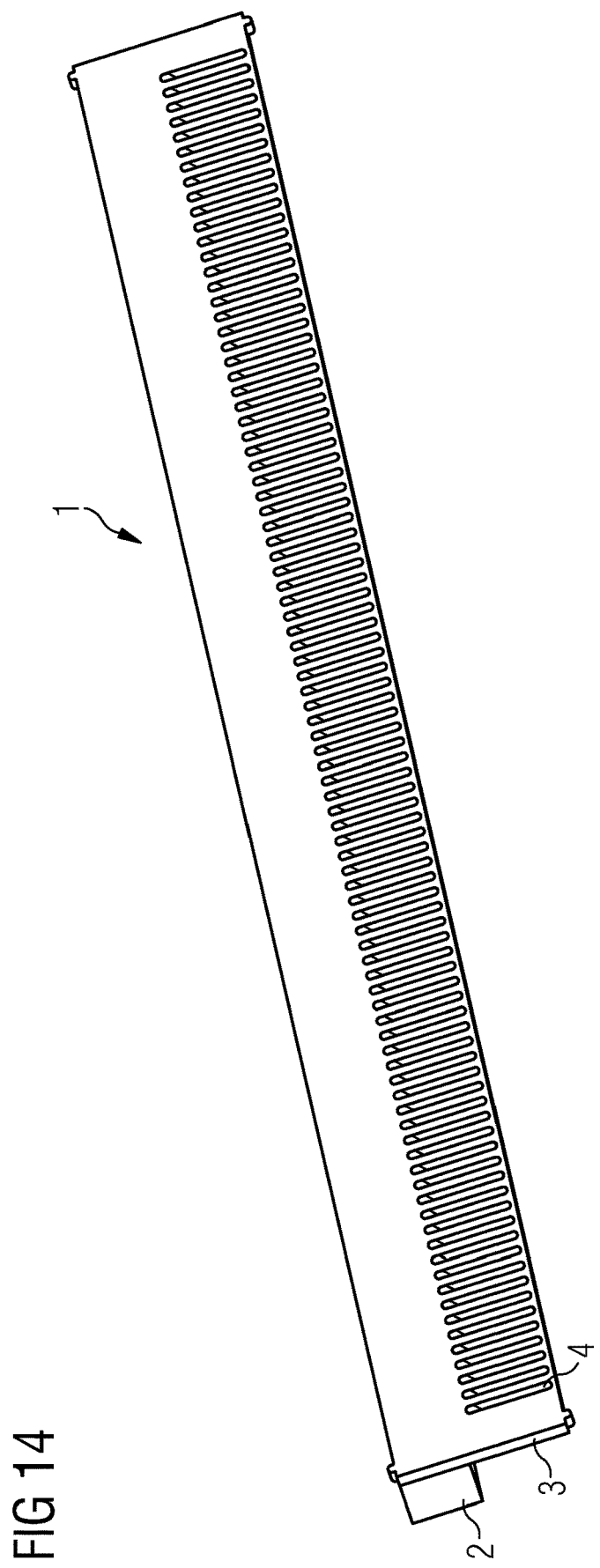

FIG. 14 illustrates a further exemplary asymmetrical embodiment of a hybrid busbar 1 which can be used in a touch protected busbar system TP-BSYS according to the present invention. The flat contact-receiving rail profile 3 is attached to a current-carrying rail profile 2 with a rectangular cross section CS.

Figure 15:
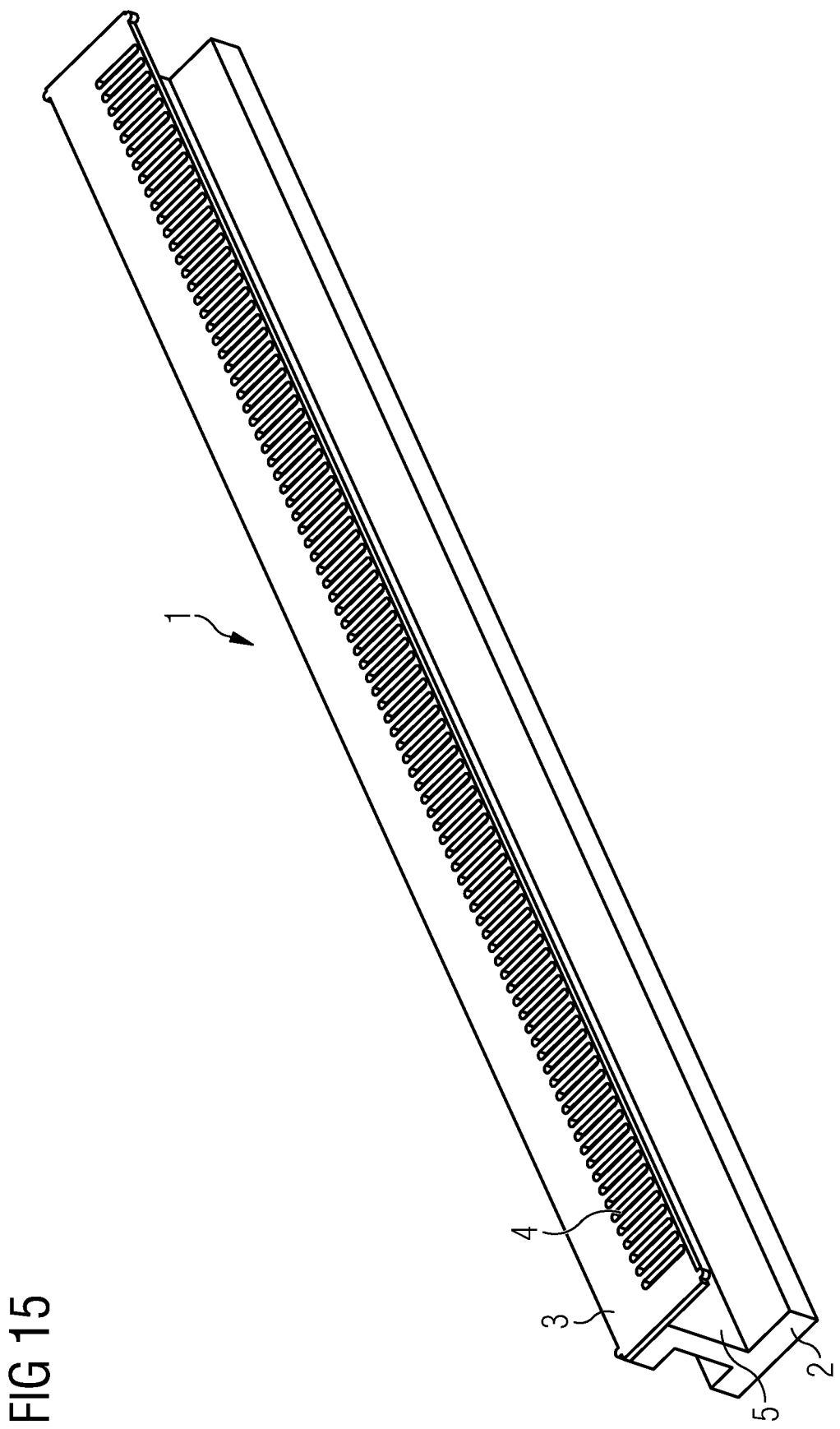

FIG. 15 illustrates a further exemplary asymmetrical embodiment of a hybrid busbar 1 which can be used in a touch protected busbar system TP-BSYS according to the present invention. In the illustrated exemplary embodiment, the current-carrying rail profile 2 comprises a T-shaped section. The current-carrying rail profile 2 comprises a relative thick cross section to carry electrical current with a high current amplitude. The flat contact-receiving rail profile 3 is attached to a flange portion of the current-carrying rail profile 2 as illustrated in FIG. 15. In the embodiment of FIG. 15, the hybrid busbar 1 has an asymmetrical form along its longitudinal axis (x-direction).

Figure 16:
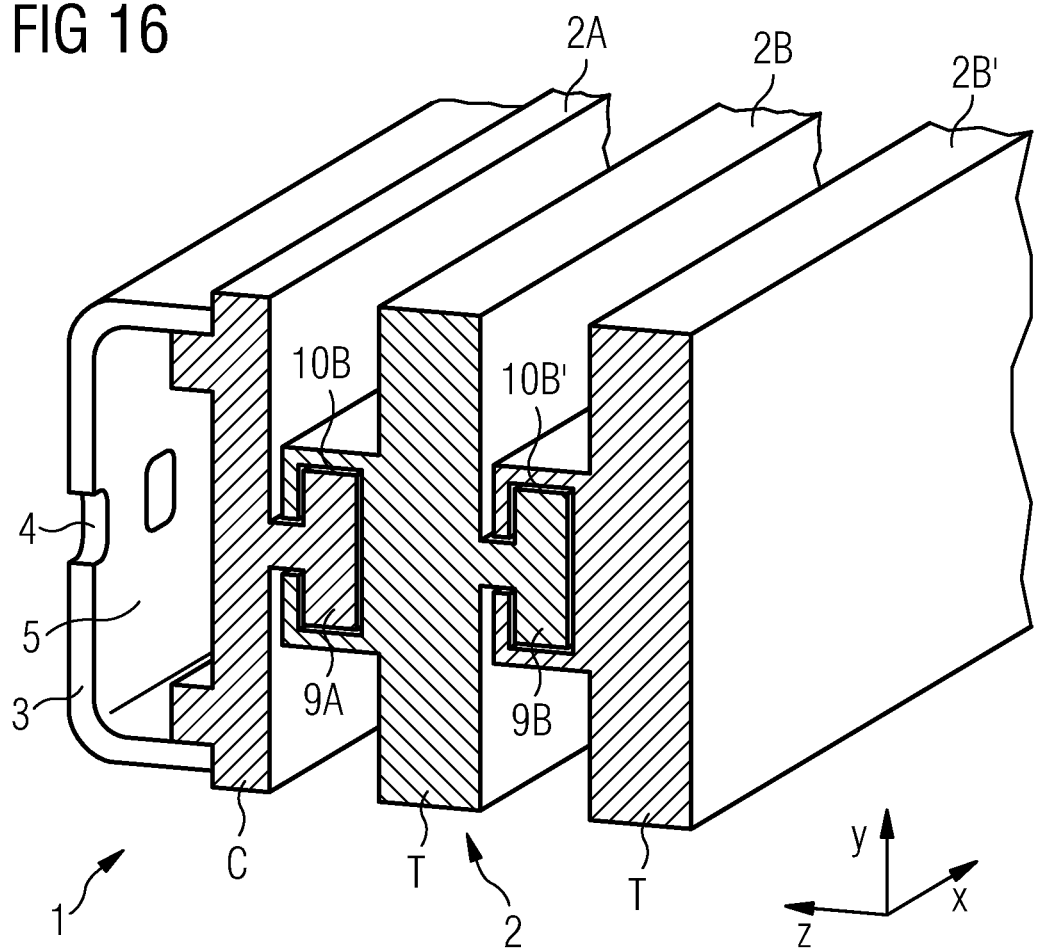

FIG. 16 shows a further exemplary symmetrical embodiment of a hybrid busbar 1 which can be used in a touch protected busbar system TP-BSYS according to the present invention. In the illustrated embodiment, the hybrid busbar 1 comprises several T-shaped profile elements 2B, 2B' which can be stacked on each other in z-direction forming a fitting physical current cross section to carry an electrical current I with a predefined high current amplitude. In the exemplary implementation of FIG. 16, the current-carrying rail profile 2 comprises three current-carrying rail profile elements 2A, 2B, 2B' stacked on top of each other in z-direction to provide a huge physical cross section for high electrical currents. The front C-shaped profile cross section 2A has in the illustrated exemplary implementation a T-shaped protrusion 9A which can be inserted into a corresponding receiving cross section 10B of a T-shaped second current-carrying rail profile element 2B. The T-shaped current-carrying rail profile element 2B comprises itself a T-shaped protruding section 9B which can be inserted into a corresponding receiving groove 10B' of the current-carrying rail profile element 2B'. The embodiment illustrated in FIG. 9 has the advantage that according to a use case and necessity of the busbar system, a physical cross section of the current-carrying rail profile 2 can be adapted by exchanging different current-carrying rail profile elements and by stacking a number of current-carrying rail profiles 2A, 2B, 2B'... until a cross section of the current-carrying rail profile 2 is sufficient for the respective system. Accordingly, the hybrid busbar 1 as illustrated in the embodiment of FIG. 16 is very flexible and can be adapted to the respective busbar system by increasing the number of current-carrying rail profile elements or by reducing the number of current-carrying rail profile elements stacked on top of each other depending on the use case. Stacking current-carrying rail profile elements such as illustrated in FIG. 16 can also be performed for the other hybrid busbar elements illustrated in FIGS. 11 to 15.

Figure 17:
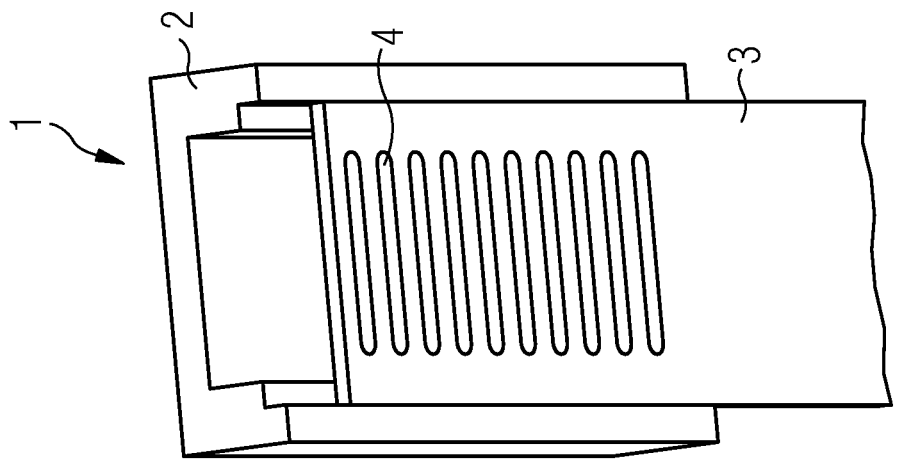
Figure 18:
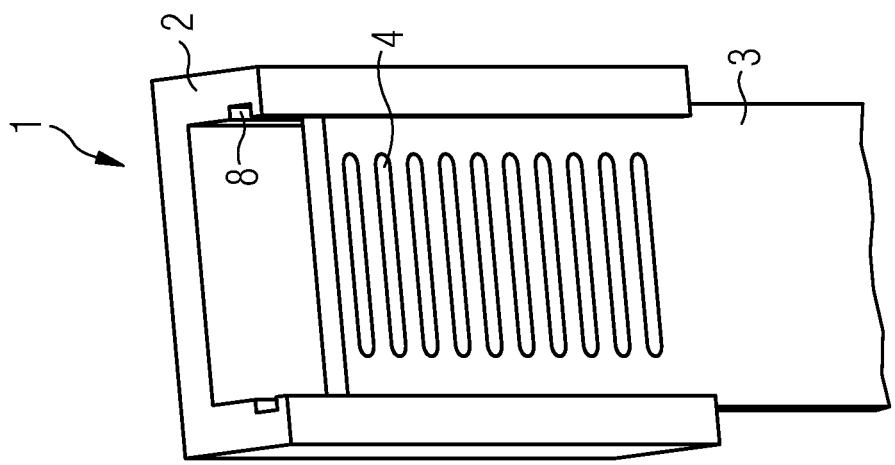
Figure 19:
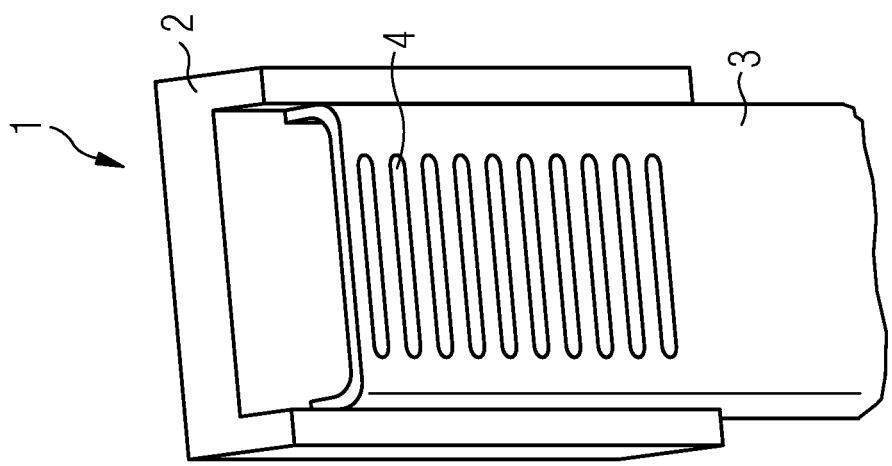

FIGS. 17, 18, 19 show further exemplary symmetrical embodiments of hybrid busbars 1 which can be employed in the touch protected busbar system TP-BSYS according to the present invention. In the illustrated embodiment of FIGS. 17, 18, the contact-receiving rail profile 3 is flat. In contrast, in the embodiment illustrated in FIG. 19, the contact-receiving rail profile 3 and the current-carrying rail profile 2 are both U-shaped and can be pressed into the receiving shape of the current-carrying rail profile 2. In the embodiment illustrated in FIG. 10, a flat contact-receiving rail profile 3 can be attached to a corresponding receiving section of the current-carrying rail profile 2, i.e. by welding or by laser-welding. In contrast, in the embodiment illustrated in FIG. 18, the flat contact-receiving rail profile 3 can be inserted into a groove 8 of the current-carrying rail profile 2. Accordingly, the embodiment illustrated in FIG. 18 has the advantage that the contact-receiving rail profile 3 can be replaced by moving it out of the groove 8. It is therefore possible to replace the contact-receiving rail profile 3. For instance, a first contact-receiving rail profile 3 having rectangular contact slots 4 as shown in FIG. 18 may be replaced by another flat contact-receiving rail profile 3 having equally spaced contact openings 4 of a different shape such as quadratic contact openings and/or round contact openings 4. In the illustrated embodiments of FIGS. 17, 18, 19, a current-carrying rail profile 2 is configured to carry electrical currents I with a comparatively small current amplitude. In the illustrated embodiments of FIGS. 17, 18, 19, the hybrid busbar 1 comprises a symmetrical form along its longitudinal axis (x-direction).

The touch protected busbar system 1 allows in a possible implementation to combine hybrid busbars 1 having an asymmetrical shape and other hybrid busbars having a symmetrical form.

Figure 20:
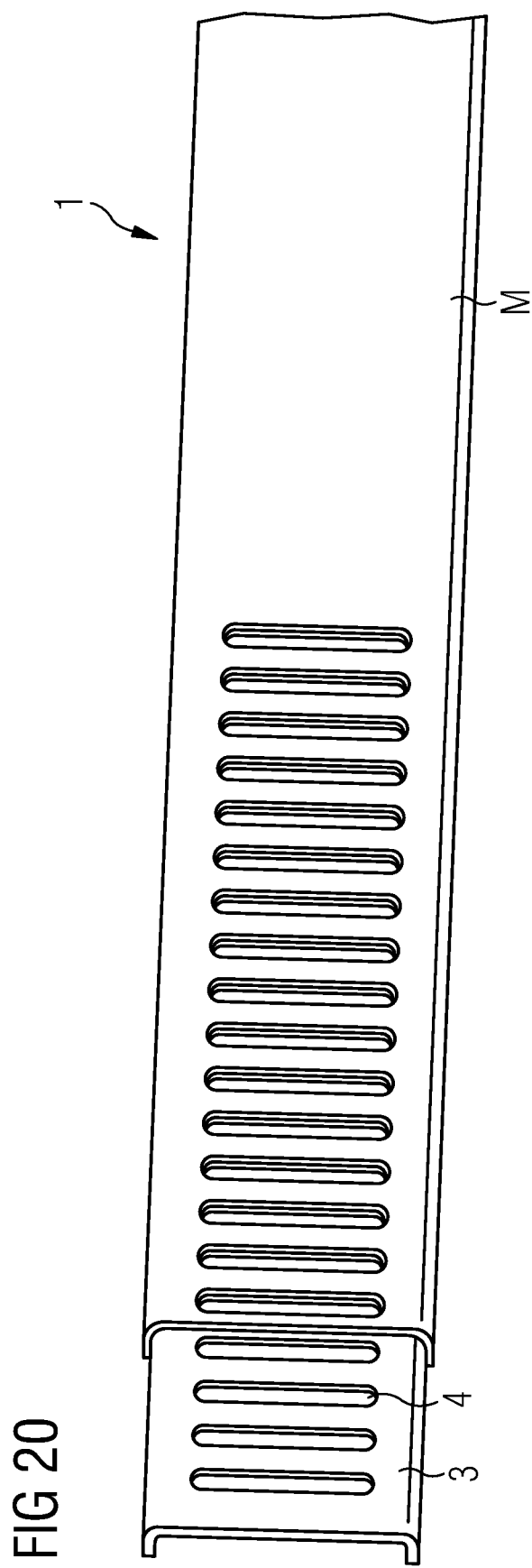

FIG. 20 shows a further exemplary embodiment of a hybrid busbar 1 which can be used in the touch protected busbar system TP-BSYS according to the present invention. In the illustrated exemplary embodiment, the contact-receiving rail profile 3 comprises a plurality of equally spaced contact openings 4. The openings 4 are equally spaced in x-direction. In the illustrated embodiment, the contact-receiving rail profile 3 is at least partially covered with an electrical isolating material, for instance a plastic material M. In the illustrated embodiment of FIG. 20, a first section of the contact-receiving rail profile 3 is not covered by the electrical isolating material M whereas another section of the contact-receiving rail profile 3 is completely covered by the electrical isolating layer made of electrical isolating materials such as the plastic material M. The electrical isolating layer can be applied to the contact-receiving rail profile 3. For instance, the equally spaced contact openings or slots 4 can be punched into the contact receiving rail profile 3 of the hybrid busbar 1. FIG. 20 shows a contact-receiving rail profile 3 with a covering isolating material M from the front side. The isolation can also be provided by separate isolating elements attached to the hybrid busbar 1.

The contact-receiving rail profile 3 can in at least one section be completely isolated by a surrounding encapsulating electrical isolating layer made of an electrical isolating material M. It is also possible that the contact-receiving rail profile 3 is only covered on the front side with an electrical isolating layer made of an isolating material M but not isolated on its rear side. In the embodiment illustrated in FIG. 20, the contact-receiving rail profile is U-shaped. Other forms of the contact-receiving rail profile 3 are possible, for instance contact-receiving rail profiles 3 as illustrated in the other embodiments of FIGS. 11 to 19.

FIGS. 21, 22 illustrate possible cross sections CS (in yz-plane) of hybrid busbars 1 to which different types of electrical devices ED can be connected.

FIG. 21 illustrates a hybrid busbar 1 comprising a contact-receiving rail profile 3 having openings 4 to receive protruding electrical contacts 6 of an electrical device ED-A of a first type. The openings 4 are equally spaced in y-direction.

In contrast, FIG. 22 illustrates an embodiment where a hybrid busbar 1 is engaged mechanically from behind by device mounting latches 7 of an electrical device ED-B of a second type. The electrical device ED-B can establish an electrical contact by means of a clamping unit 22 or a clamping element 28 as shown in FIG. 27. The device mounting latch 7 has a shape which allows to connect the electrical device ED-B also to a conventional massive busbar with a rectangular cross section CS.

In both embodiments of FIGS. 21, 22, the current-carrying rail profile 2 and the contact-receiving rail profile 3 provide at least one rectangular boundary cross section CS. The rectangular cross section of the hybrid busbar 1 comprises a rectangular envelope cross section CS surrounding the current-carrying rail profile 2 and the at least one contact-receiving rail profile 3.

The hybrid busbar 1 can be either connected from the front side (in z-direction) by electrical devices ED-A having protruding electrical contacts 6 or by another type of electrical devices ED-B having hook-shaped mounting device latches 7 as illustrated in FIG. 22. Consequently, the hybrid busbar 1 and the touch protected busbar system TP-BSYS according to the present invention can be used for a wide variety of different electrical devices ED and is very flexible in use. Further, the mounting of electrical devices ED such as electrical device ED-A and ED-B to the touch protected busbar system TP-BSYS can be done without use of any adapter element or requiring any tools.

The rectangular envelope cross section CS of the hybrid busbar 1 can comprise in a possible embodiment a predefined width W and a predefined height H. In a possible implementation, the width W of the rectangular envelope cross section CS is between 12 mm and 30 mm. Further, the height H of the rectangular envelope cross section CS can in a possible embodiment be 5 mm or 10 mm. Consequently, the rectangular envelope cross section CS can comprise in a possible implementation the following dimensions: 10×12 mm, 10×20 mm, 10×24 mm, 10×30 mm. In a further implementation, the rectangular envelope cross section CS of the hybrid busbar 1 can comprise the following dimensions: 5×12 mm, 5×20 mm, 5×24 mm, 5×30 mm. Consequently, the touch protected busbar system TP-BSYS according to the present invention is completely compatible with existing busbar systems. The rectangular cross section CS corresponds to the cross section of a conventional massive busbar thus allowing a mix of hybrid busbars 1 and conventional busbars within the touch protected busbar system TP-BSYS.

The contact openings 4-$i$ of the contact-receiving profile 3 are configured to be equidistant (in x-direction) thus forming a constant contact receiving grid. Moreover, the contact openings 4-$i$ of the contact-receiving profile 3 can comprise in different embodiments different shapes including rectangular contact slots, quadratic contact openings or even round contact openings. The shape of the contact openings 4-$i$ can vary depending on the use case as well as depending on the form and shape of the protruding electrical contact 6 of the respective electrical devices ED to be connected to the touch protected busbar system TP-BSYS.

Between the contact-receiving rail profile 3 and the current-carrying rail profile 2, there is an empty space or chamber 5 which allows to insert protruding electrical contacts 6 from electrical devices ED in z-direction through the contact openings 4-$i$ to establish an electrical connection with the hybrid busbar 1 and the corresponding touch protected busbar system TP-BSYS. In x-direction on both sides of the electrical contact 6 illustrated in FIG. 21, a contact protection rib of the same shape can be provided to provide mechanical support. Both protruding contact protection ribs are inserted in z-direction along with the intermediate electrical contact 6 into three neighbouring contact openings or slots 4 either directly or through openings 16 of a touch protection element TPE. The height and size of the chamber 5 for receiving the protruding electrical contacts 6 (and protection ribs) as illustrated in FIGS. 21, 22 can vary depending on the used electrical devices ED and the form and shape of their protruding electrical contacts 6.

The advantage of all embodiments of the hybrid busbar 1 used in the touch protected busbar system TP-BSYS according to the present invention is that the envelope cross section CS and size of the current-carrying rail profile 2 defines a current amplitude which can be carried by the hybrid busbars 1. Most of the electrical current I flowing through the hybrid busbar 1 is carried by the current-carrying rail profile 2. Only a comparatively low portion of the electrical current I can be carried by the contact-receiving rail profile 3 because of the contact openings 4. Consequently, the size and shape of the current-carrying rail profile 2 can define a maximum amplitude of the carried electrical current I which can flow through the hybrid busbar 1 of the touch protected busbar system TP-BSYS. In a possible implementation, the current-carrying rail profile 2 can be mechanically connected to the contact-receiving rail profile 3 in such a way that only a very high mechanical force can separate the two components or elements of the hybrid busbar 1 from each other. In other alternative embodiments, the current-carrying rail profile 2 and the contact-receiving rail profile 3 can be separated from each other, for instance for replacing an existing current rail profile 2 by a new current-carrying rail profile 2' having a different shape or cross section CS.

Figure 23:
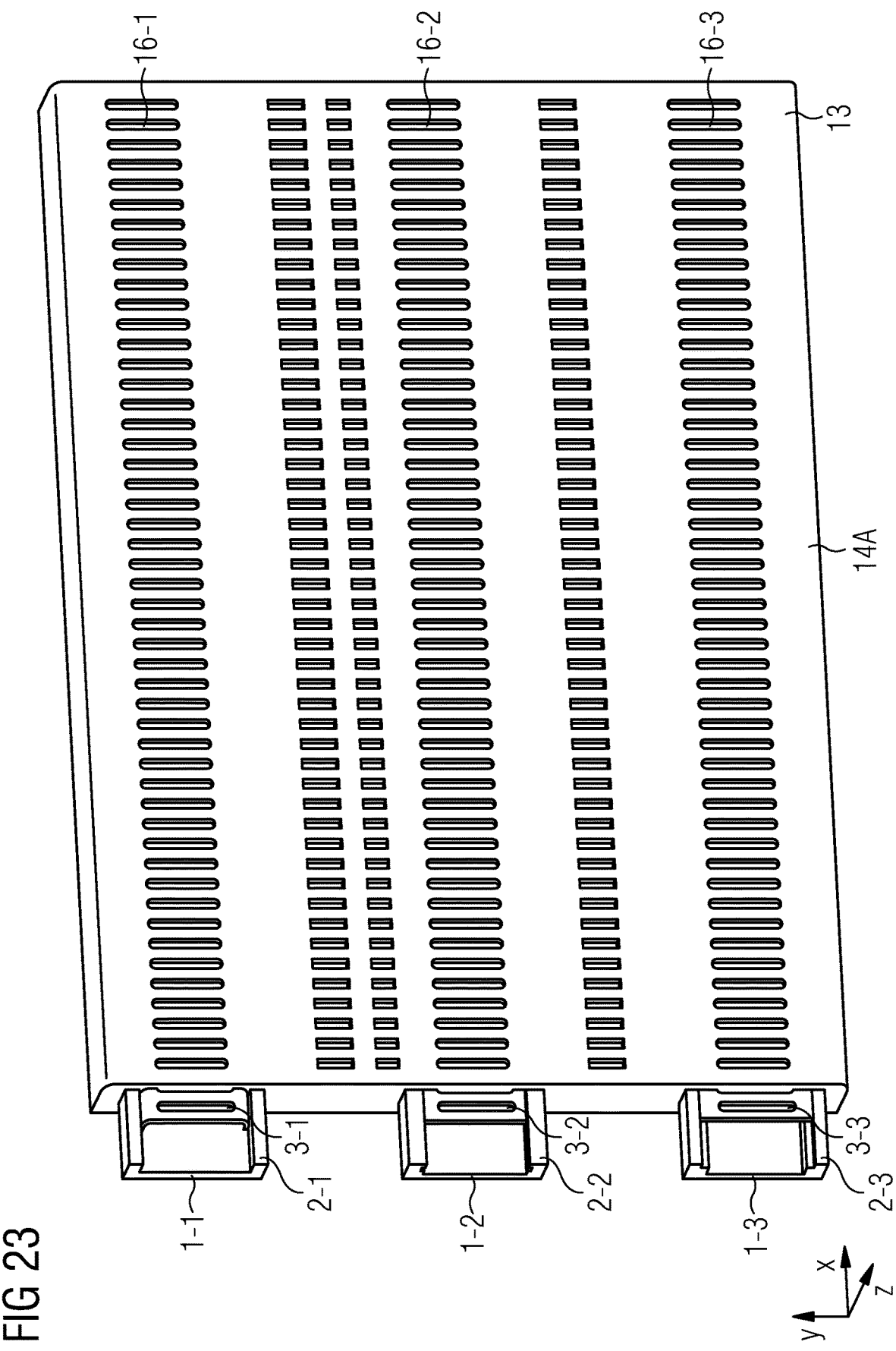
FIG. 23 shows a possible exemplary embodiment of a touch protected busbar system according to the first aspect of the present invention.

FIG. 23 shows an exemplary (more simple) embodiment of a touch protected busbar system 1. In the illustrated embodiment, the touch protected busbar system 1 comprises a front section panel 14A having a number of rows 16-1, 16-2, 16-3 of equally spaced contact openings 16 which are aligned with equally spaced contact openings 4 of contact-receiving rail profiles 3-i of hybrid busbars 1-1, 1-2, 1-3. In the illustrated exemplary embodiment of FIG. 23, the front panel 14A can be integrated with a rear panel 14B to encapsulate the hybrid busbars 1-i on the front and rear side completely. In the illustrated embodiment, the front panel 14A and rear panel 14B can form an encapsulating housing 13 made of an electrical isolating material which can protect a user efficiently against high electrical currents and/or electrical voltages. Electrical devices such as the electrical devices ED-A illustrated in FIG. 21 can be attached to the touch protected busbar system TP-BSYS inserting the electrical contacts 6 passed through the contact openings 16 of the front panel or front section 14A and then through the aligned contact openings 4 of the contact-receiving rail profiles 3-i lying directly beneath the contact openings 16.

Figure 24:
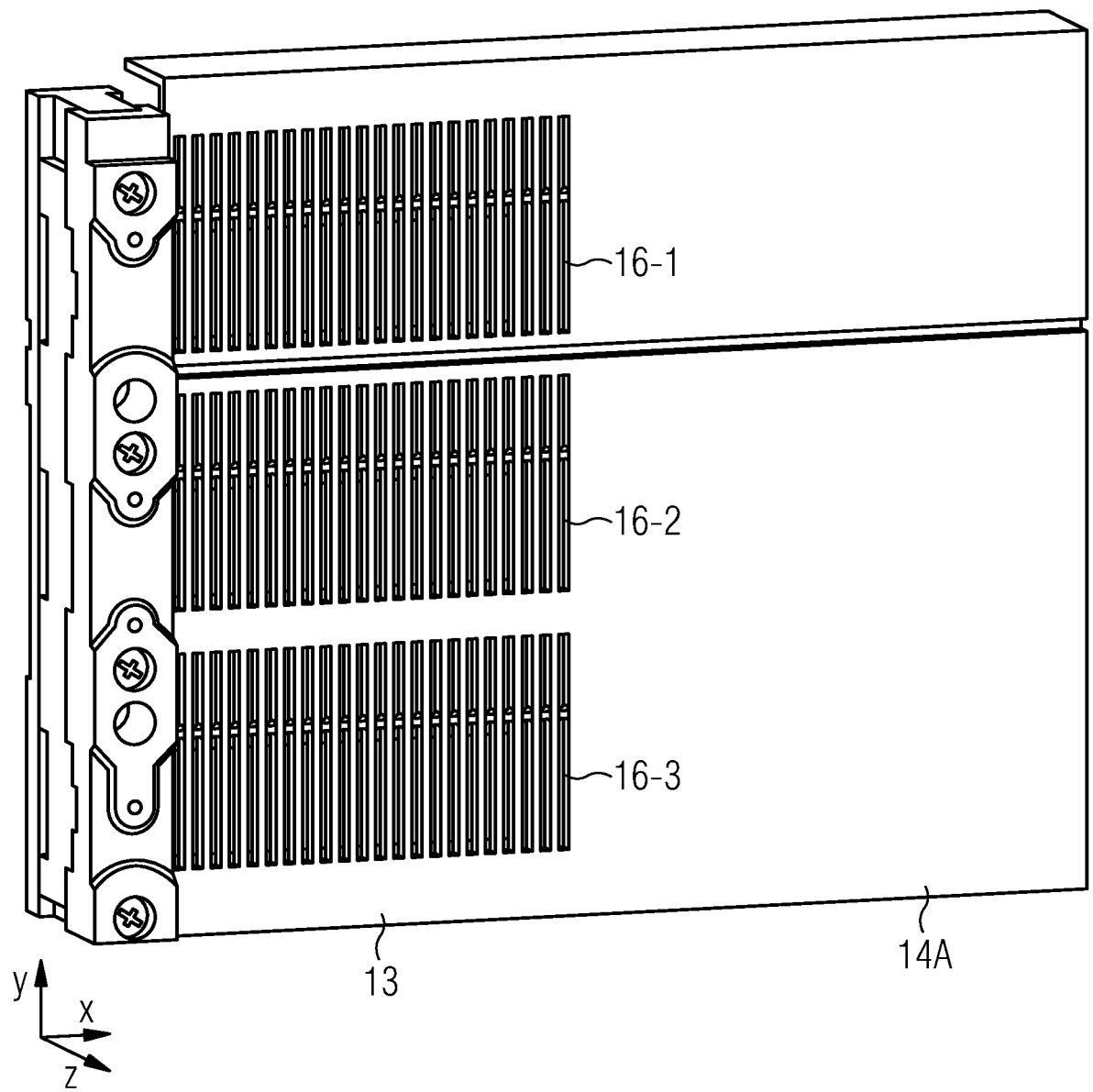
FIG. 24 shows a further exemplary embodiment of a touch protected busbar system according to the first aspect of the present invention.

FIG. 24 shows an embodiment where the different rows 16-i of the equally spaced contact openings 16 do not cover the complete front cover or front panel 14A of the isolating housing 13.

A preferred embodiment of a touch protected busbar system TP-BSYS having a front side panel 14A and a rear side panel 14B forming an integrated encapsulating and isolating housing 13 is illustrated in FIGS. 31, 32. The front side panel 14A can comprise configuration portions 12. These configuration portions 12-1, 12-2 can be moveable or integrated in the front side panel 14A. In a preferred embodiment, the configuration portions 12-1, 12-2 of the front side panel 14A can be moved by a user between different configuration positions depending on the type of electrical devices ED the user wants to attach to the touch protected busbar system TP-BSYS.

In a possible embodiment, rectangular envelope cross sections CS of the hybrid busbars 1 can be formed such that they correspond in their dimensions, i.e. height H and width W to conventional non-hybrid busbars. Accordingly, the hybrid busbars 1 used by the touch protected busbar system TP-BSYS can be easily used to replace existing conventional busbars. In a possible embodiment, the touch protected busbar system TP-BSYS can even comprise a mix of normal conventional busbars and hybrid busbars 1. In a possible embodiment, the touch protected busbar system TP-BSYS can comprise longitudinal busbar connectors adapted to connect mechanically and electrically at least one non-hybrid busbar with at least one hybrid busbar 1. Such a longitudinal busbar connector can be formed such that it provides a mechanical and electrical connection, e.g. between three parallel hybrid busbars 1-1, 1-2, 1-3 and three non-hybrid busbars.

Figure 25:
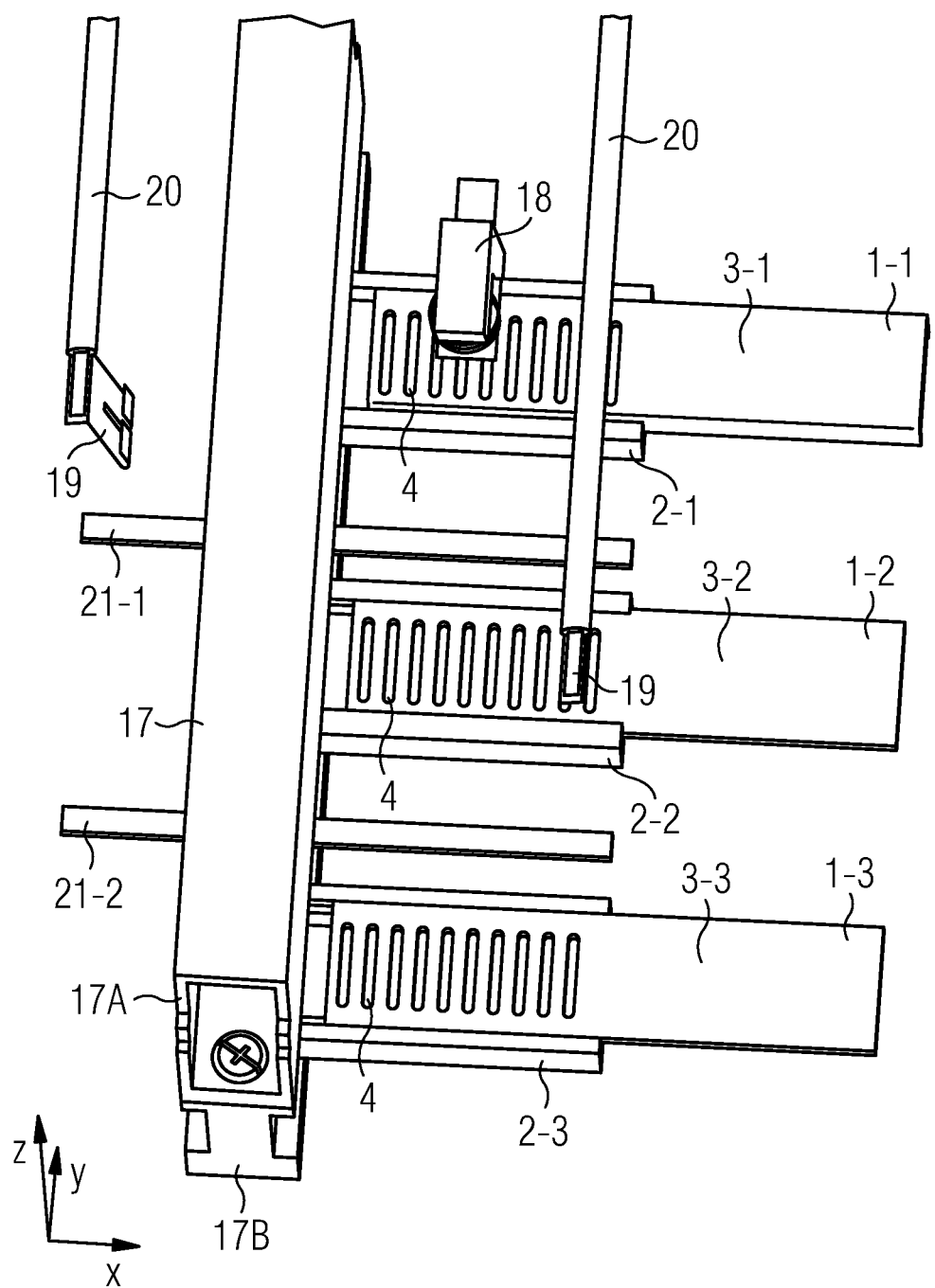
FIG. 25 shows exemplary possible connection alternatives for connecting electrical devices to busbars of a touch protected busbar system according to the first aspect of the present invention.
Figure 26:
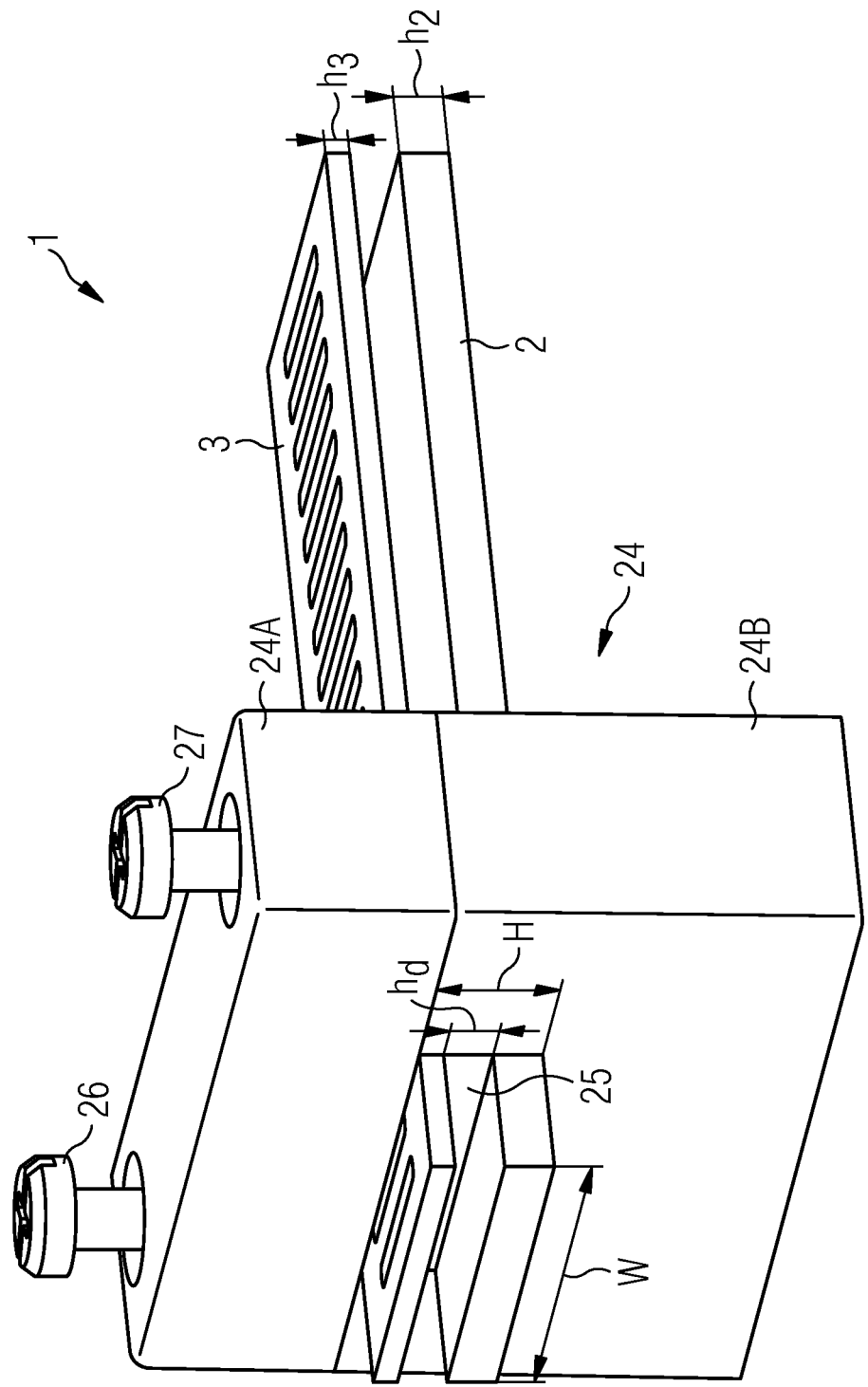
FIG. 26 shows an exemplary mechanical connection element which can be used for a two-part symmetrical hybrid busbar within a touch protected busbar system according to the first aspect of the present invention.

FIG. 25 shows possible alternatives to connect electrical devices ED with hybrid busbars 1 of the touch protected busbar system TP-BSYS according to the invention. In the illustrated embodiment, the shown hybrid busbars 1 are symmetrical in form having a flat contact-receiving rail profile 3-i. In other embodiments, the hybrid busbars 1-i can also comprise asymmetrical hybrid busbars 1. The busbar support element 17 carries the three hybrid busbars 1-1, 1-2, 1-3 each consisting of a current-carrying rail profile 2-1, 2-2, 2-3 and an attached integrated contact-receiving rail profile 3-1, 3-2, 3-3 with contact openings 4. The busbar carrying element or busbar support element 17 can for instance be attached to a mounting plate of an electrical control cabinet. Clamping brackets 18 as illustrated in the embodiment of FIG. 26 can be used to contact the hybrid busbars 1. These clamping brackets 18 can be designed to be inserted through the contact openings 16 and to engage with equally spaced contact openings 4 of the contact-receiving rail profile 3-i of the hybrid busbar 1. The system can comprise engaging traversing rails 21-i which can be used for mechanical engaging elements of the electrical devices ED attached to the busbar system, especially to fix mechanically electrical devices ED having a high physical weight. The touch protected busbar system TP-BSYS according to the present invention can surround the included hybrid busbars 1 in a possible embodiment completely. In an alternative embodiment, the touch protected busbar system TP-BSYS comprises touch protection elements TPE or a panel covering the front side of the busbars 1. Electrical devices ED can also be mounted by means of electrical cables 20 having electrical contacts 19 inserted into contact openings or slots 4 of the hybrid busbars (e.g. through contact openings 16 of TPEs) as shown in FIG. 25.

FIG. 26 illustrates a further possible embodiment of a contact-receiving rail profile 3 which is connected to a current-carrying rail profile 2 by means of a mechanical connection element 24 using an intermediate distance element 25 made out of an electrically conductive material and positioned between the contact-receiving rail profile 3 and the current-carrying rail profile 2. In the illustrated embodiment, the mechanical connection element 24 can form part of a busbar support element 17 and may have a first portion 24A, a second portion 24B including a receiving groove to receive a hybrid busbar 1. The receiving groove has a height H and a width W defining a rectangular cross section CS corresponding to the bounding geometry of the rectangular cross section CS of the hybrid busbar 1. The height H of the distance element 25 can depend on the height H of the contact-receiving rail profile 3 and the height H of the current-carrying rail profile 2.

The intermediate distance element 25 is made of an electrical conducting material and can be a separate exchangeable element or attached to either the contact-receiving rail profile 3 or the current-carrying rail profile 2. Screws 26, 27 can be used to fix the upper portion 24A to the lower portion 24B of the mechanical connection element 24 and may slightly press the contact-receiving rail profile 3 via the intermediate distance element 25 on the current-carrying rail profile 2. In an alternative embodiment, the contact-receiving rail profile 3 can be fixed to the current-carrying rail profile 2 by other mechanical connection means including bolts or clinch elements.

In a further possible embodiment, the hybrid busbar 1 can comprise besides the contact-receiving rail profile 3 and the current-carrying rail profile 2 additional data transmission rail profile elements extending in parallel with the contact-receiving rail profile 3 and the current-carrying rail profile 2 in x-direction. The data transmission rail profile can be used in a possible implementation for a data transfer of data signals between electrical devices ED having protruding contacts 6 inserted into slots 4 of the contact-receiving rail profile 3 and/or by electrical devices ED engaging the current-carrying rail profile 2 by means of device hook-shaped latches 7. In an alternative embodiment, the communication of data transfer can take place by PLC via the hybrid busbar 1, i.e. via the current-carrying rail profile 2 and/or via the contact-receiving rail profile 3.

In a possible embodiment, the current-carrying rail profile 2 comprises a rail profile consisting of copper, aluminium or a multicomponent material. The contact-receiving rail profile 3 can be made of copper, tin-coated copper or silver-coated copper and/or brass.

The cross section of the current-carrying rail profile 2 can be configured to carry an alternating or direct current with a predefined high current amplitude of up to 5000 Ampere.

FIG. 27 illustrates a clamping unit 22 and 28 which can be used for connecting electrical devices ED and other components to a hybrid busbar 1 as illustrated in FIG. 27. The clamping unit 22 as well as 28 can be integrated in an electrical device ED and can both be used to establish an electrical contact between the electrical device ED and the hybrid busbar 1 through openings of a touch protection element TPE.

The clamping unit 22 can include a screw or threaded pin 22C used for attaching a component or electrical device ED to the hybrid busbar 1. The clamping unit 22 provides electrical contact by means of a comb contact pressed through the openings of the TPE against the contact-receiving profile 3. The counterforce is provided by the mounting latches 7A, 7B.

Further, FIG. 27 shows schematically a protruding electrical contact 6 or contact element 19 which can be inserted into a slot 4 of the contact-receiving rail profile 3 of the hybrid busbar 1. An electrical contact 19 of an electrical cable 20 can also be inserted into such a contact-receiving slot 4 of the contact-receiving rail profile 3.

The hybrid busbar 1 can also be connected by means of a clamp unit 28 having a spring element 29 that presses contact tongues 28A in z-direction on the hybrid busbar 1 to provide a contact between a component or electrical device ED and the hybrid busbar 1 (for instance a current-carrying rail). The clamping unit 22 and 28 both comprise two mounting latches 7A, 7B engaging the hybrid busbar 1 from behind as illustrated in FIG. 27 to provide a counterforce in z-direction.

A comb contact plate 22A of the clamping unit 22 can comprise protruding fingers 22B-1, 22B-2, 22B-3 which can be inserted in z-direction either directly or indirectly through corresponding openings 16 of a touch protection element TPE into the slots 4 of the hybrid busbar 1 to provide a tight fixed mechanical and electrical connection with the hybrid busbar 1. The spring element 29 of the clamp unit 28 allows to snap the clamping element 28 onto the hybrid busbar 1 and presses the contact tongues 28A in z-direction on the hybrid busbars 1 to establish an electrical contact through openings 16 of a touch protection element TPE. The contact force can be either provided by elastic material properties of the contact tongues 28A themselves or by a separate contact spring component 29 as illustrated in FIG. 27.

The clamping unit 22 and the clamp element 28 can provide for more flexibility of the busbar system allowing also to attach additional components to the hybrid busbars 1. The clamping unit 22 as well as the clamping element 28 can also be attached to conventional busbars having a rectangular cross section CS allowing for even more flexibility.

Figure 28:
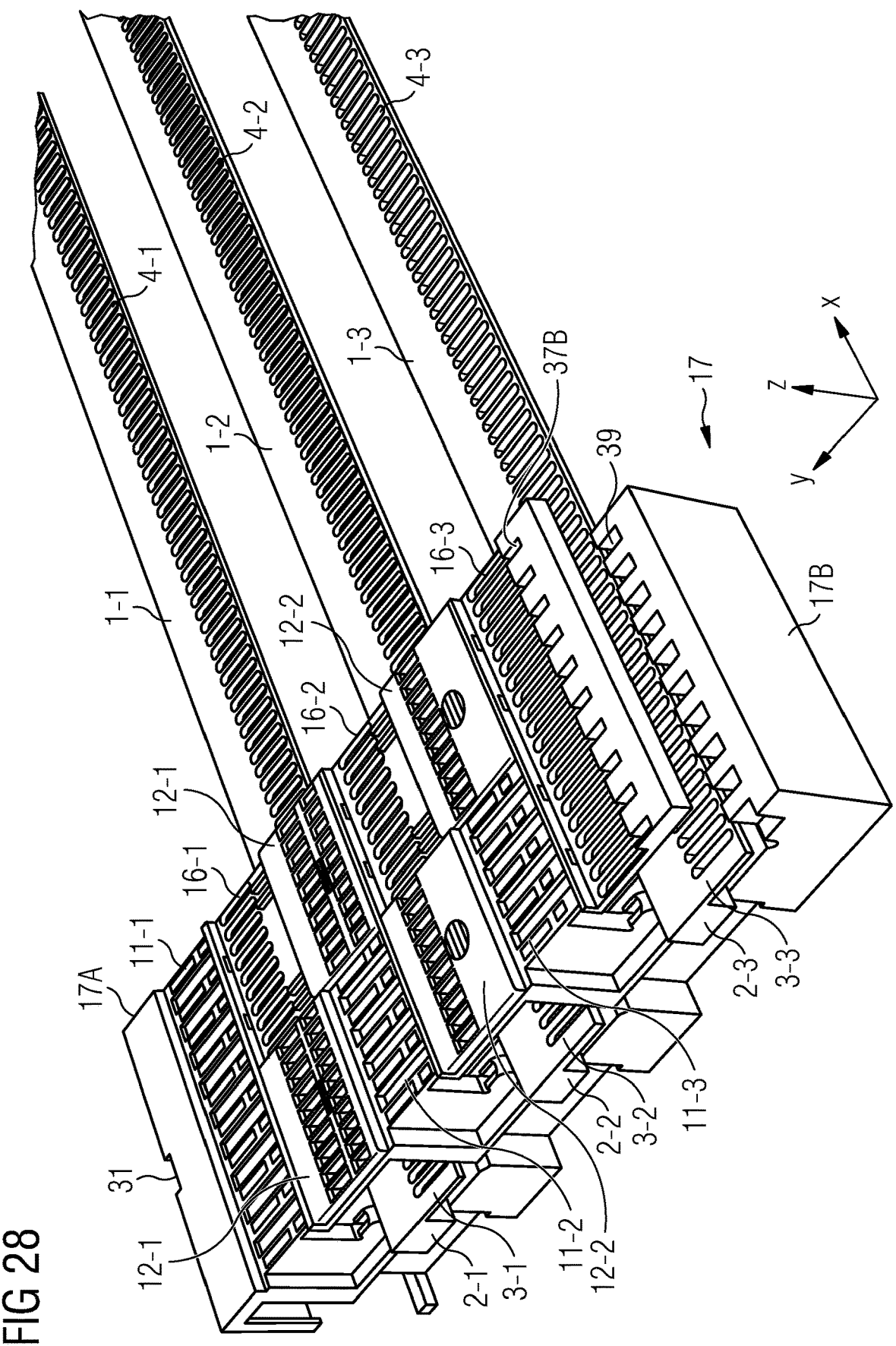
FIGS. 28 to 30 show a further possible embodiment of a busbar support element.
Figure 29:
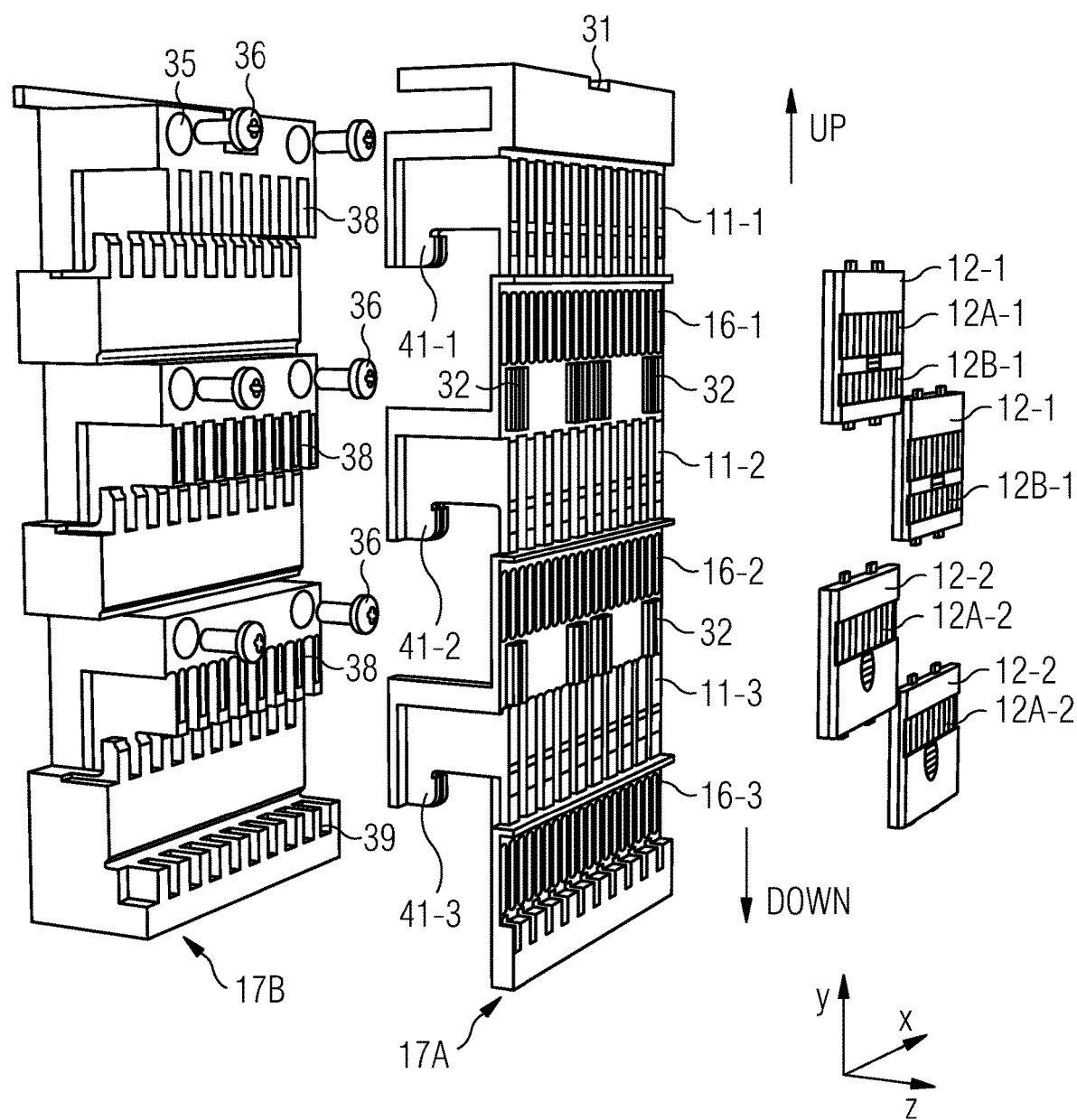
Figure 30:
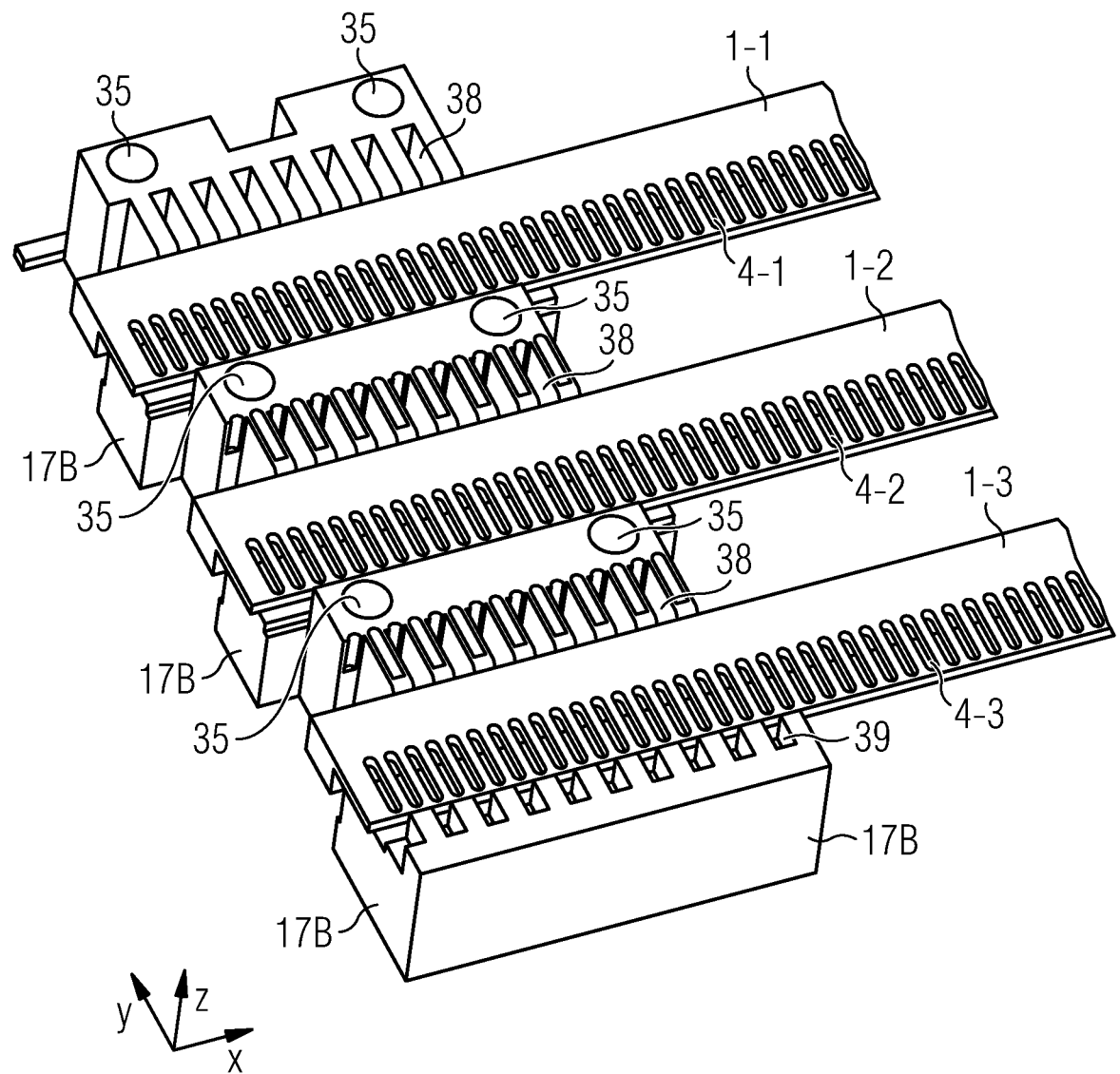

FIGS. 28, 29, 30 show a further exemplary embodiment of a busbar support element 17 which can be used in the touch protected busbar system according to the present invention. FIG. 28 shows a perspective front view of a busbar support element 17 comprising a basic busbar support element 17B which can be covered by a touch protected front element 17A as also illustrated in FIG. 29. The basic busbar support element 17B comprises cavities 38 to receive protruding device mounting latches 7 of electrical devices ED-B. The basic busbar support element 17B comprises holes 35 for screws 36 to mount the basic busbar support element 17B to a mounting plate.

FIG. 30 illustrates the basic busbar support element 17B in a perspective view without the covering touch protection element 17A. The basic busbar support element 17B comprises openings or cavities 39 for receiving mechanical engagement elements 37A (shown in FIG. 6A) as illustrated in FIGS. 29, 30. In the illustrated embodiment, the front element 17A of the busbar support element 17 can also comprise configuration portions 12 as shown in FIGS. 28, 29. The width of the busbar support element 17 illustrated in FIG. 28 can correspond to the width of two more touch protection elements TPE as illustrated in FIGS. 2, 3. The covering touch protection front element 17A has engaging elements 41-1, 41-2, 41-3 to engage corresponding sections of the basic busbar support element 17B from behind to receive mechanical forces of the busbars in z-direction.

Different embodiments of the hybrid busbars 1 and the touch protection elements TPE as illustrated in the different figures can be combined with each other. Accordingly, the figures illustrate only exemplary embodiments but other embodiments forming combinations of the different embodiments are also possible.

The invention claimed is:

1. A touch protected busbar system comprising:
    at least one hybrid busbar having a current-carrying rail profile; and
    a contact-receiving rail profile providing contact openings configured to receive protruding electrical contacts of electrical devices to be connected to said touch protected busbar system,
    wherein the at least one hybrid busbar is at least partially covered by electrical isolating touch protection elements of said touch protected busbar system and/or at least partially encapsulated by an electrical isolating layer, and
    wherein the electrical isolating touch protection elements are mounted by busbar mounting hooks on the at least one hybrid busbar and includes latch openings adapted to receive device mounting latches of electrical devices to be connected to said touch protected busbar system.

2. A touch protected busbar system comprising:
    at least one hybrid busbar having a current-carrying rail profile; and
    a contact-receiving rail profile providing contact openings configured to receive protruding electrical contacts of electrical devices to be connected to said touch protected busbar system, wherein the at least one hybrid busbar is at least partially covered by electrical isolating touch protection elements of said touch protected busbar system and/or at least partially encapsulated by an electrical isolating layer, wherein the at least one hybrid busbar of said touch protected busbar system, and other hybrid busbars or non-hybrid busbars included in said touch protected busbar system, are mounted on busbar support elements of said touch protected busbar system, and wherein the busbar support elements are configured to receive electrical devices covering the busbar support elements.

3. A touch protected busbar system comprising:
at least one hybrid busbar having a current-carrying rail profile; and
a contact-receiving rail profile providing contact openings configured to receive protruding electrical contacts of electrical devices to be connected to said touch protected busbar system,
wherein the at least one hybrid busbar is at least partially covered by electrical isolating touch protection elements of said touch protected busbar system and/or at least partially encapsulated by an electrical isolating layer,
wherein several of said electrical isolating touch protection elements are integrated forming a front side electrical isolating touch protection panel at a front side of said touch protected busbar system, and
wherein the front side electrical isolating touch protection panel is mechanically connected with a rear side electrical isolating touch protection panel at a rear side of said touch protected busbar system opposite said front side, to form an electrical isolating housing encapsulating the at least one hybrid busbar of said touch protected busbar system.

4. The touch protected busbar system according to claims 1, 2 or 3, wherein:
the at least one hybrid busbar includes the current-carrying rail profile and the contact-receiving rail profile, and
the current-carrying rail profile and the contact-receiving rail profile are either connected or are formed as an integrated monolithic hybrid busbar.

5. The touch protected busbar system according to claims 1, 2 or 3, wherein the electrical isolating touch protection elements are mounted on the busbars and include contact openings aligned with said contact openings of said contact-receiving rail profiles of said at least one hybrid busbar covered by said touch protection elements.

6. The touch protected busbar system according to claims 2 or 3, wherein the electrical isolating touch protection elements are mounted by busbar mounting hooks on the at least one hybrid busbar and include latch openings adapted to receive device mounting latches of electrical devices to be connected to said touch protected busbar system.

7. The touch protected busbar system according to claim 6, wherein the device mounting latches of the electrical devices are hook-shaped and adapted to be passed through the latch openings of the electrical isolating touch protection elements and to engage the at least one hybrid busbar, or non-hybrid busbars included in the touch protected busbar system, covered by said touch protection elements from behind.

8. The touch protected busbar system according to claims 1, 2 or 3, wherein the electrical isolating touch protection element comprises at least one configurable electrical isolating touch protection element having a configuration portion adapted to provide a first configuration where the protruding electrical contacts of electrical devices can be passed through contact openings of the respective touch protection element and can be plugged into aligned contact openings of contact-receiving rail profiles of the at least one hybrid busbar covered by said touch protection element.

9. The touch protected busbar system according to claim 8, wherein the at least one configuration portion of the configurable electrical isolating touch protection element is adapted to provide a second configuration in which device mounting latches of electrical devices can be passed through latch openings of the respective touch protection element and can engage the at least one hybrid busbar, and/or non-hybrid busbars included in the touch protected busbar system, covered by said touch protection element from behind.

10. The touch protected busbar system according to claim 8, wherein the at least one configuration portion of the configurable electrical isolating touch protection element is moveable between a first position to provide a first configuration and a second position to provide a second configuration of said configurable touch protection element or wherein the at least one configuration portion of said configurable electrical isolating touch protection element is mounted on or integrated with said electrical isolating touch protection element in a fixed position to provide either a first configuration or a second configuration of said configurable touch protection element
wherein the electrical isolating touch protection element comprises a preconfigured touch protection element providing a first configuration where protruding electrical contacts of electrical devices can be passed through contact openings of the respective preconfigured touch protection element and can be plugged into aligned contact openings of the contact-receiving rail profiles of the at least one hybrid busbar covered by said preconfigured touch protection element or providing a second configuration where device mounting latches of electrical devices can be passed through the latch openings of the respective preconfigured touch protection element and can engage the at least one hybrid busbar, or non-hybrid busbars included in the touch protected busbar system, covered by said preconfigured touch protection element from behind.

11. The touch protected busbar system according to claims 1, 2 or 3, wherein the electrical isolating touch protection element comprises a preconfigured touch protection element adapted to cover the at least one hybrid busbar, and/or non-hybrid busbars included in the touch protected busbar system, completely.

12. The touch protected busbar system according to claims 1, 2 or 3, wherein the electrical isolating touch protection elements mounted on busbars of said touch protected busbar system include contact openings that are equally spaced and aligned with the equally spaced contact openings of the contact-receiving rail profiles of the at least one hybrid busbar, covered by said touch protection elements.

13. The touch protected busbar system according to claims 1 or 3, wherein the at least one hybrid busbar of said touch protected busbar system and other hybrid busbars, or non-hybrid busbars included in said touch protected busbar system, are mounted on busbar support elements of said touch protected busbar system, wherein the busbar support elements are configured to receive electrical devices covering the busbar support elements.

14. The touch protected busbar system according to claims 1, 2 or 3, wherein the at least one hybrid busbar, and/or non-hybrid busbars included in the touch protected busbar system said touch protected busbar system, comprise centering cavities or centering protrusions used for positioning the touch protection elements precisely when mounted on the at least one hybrid busbar and the non-hybrid busbars, respectively.

15. The touch protected busbar system according to claims 1, 2 or 3, further comprising at least an electrical isolating touch protection panel mounted on the rear side of said touch protected busbar system.

16. The touch protected busbar system according to claims 1 or 2, wherein several electrical isolating touch protection elements are integrated forming a front side electrical isolating touch protection panel at a front side of said touch protected busbar system,
wherein the front side electrical isolating touch protection panel is mechanically connected with a rear side electrical isolating touch protection panel at a rear side of said touch protected busbar system opposite said front side, to form an electrical isolating housing encapsulating the busbars of said touch protected busbar system.

17. The touch protected busbar system according to claims 1, 2 or 3, wherein the electrical isolating touch protection element comprises a mechanical removal protection adapted to block a removal of the respective touch protection element from said touch protected busbar system.

18. The touch protected busbar system according to claims 1, 2 or 3, wherein the electrical isolating touch protection element is adapted to cover at least two hybrid busbars, and/or non-hybrid busbars included in the touch protected busbar system, mounted in parallel in said touch protected busbar system.

19. The touch protected busbar system according to claims 1, 2 or 3, wherein the electrical isolating touch protection element comprises mechanical interfaces to connect mechanical components with said touch protected busbar system, wherein the mechanical components connected via mechanical interfaces of the electrical isolating touch protection elements to said touch protected busbar system comprise components to receive additional busbars used to carry electrical current and/or used to carry information and/or auxiliary components, in particular auxiliary components used to label the respective touch protection elements or connected electrical devices.

20. The touch protected busbar system according to claims 1, 2 or 3, wherein the electrical isolating touch protection elements comprise slots to receive protruding mechanical locking elements of electrical devices with protruding electrical contacts mounted on said touch protection elements and electrically connected to the at least one hybrid busbar, and/or electrically connected to non-hybrid busbars included in the touch protected busbar system, covered by the respective touch protection elements, and/or wherein the electrical isolating touch protection elements comprise openings to receive mechanical engaging elements of electrical devices locking into underlying cavities.

21. The touch protected busbar system according to claims 1, 2 or 3, wherein the electrical isolating touch protection elements are made of fire-resistant and heat-conducting plastic material, in particular a fire-resistant and heat-conducting transparent plastic material.

22. The touch protected busbar system according to claims 1, 2 or 3, wherein the hybrid busbar comprises at least one bounding geometry having a rectangular cross section engageable by hook-shaped mounting latches of electrical devices or electrical connectors or electrical adapters to be connected to said touch protected busbar system.

23. The touch protected busbar system according to claims 1, 2 or 3, wherein the hybrid busbar is formed symmetrical with the contact-receiving rail profile connected to the current-carrying rail profile by a force-fit or form-fit or a material-fit connection or is formed asymmetrically with the contact-receiving rail portion attached lateral to the current-carrying rail profile.

24. The touch protected busbar system according to claims 1, 2 or 3, wherein the electrical isolating touch protection elements provide an intrusion protection according to protection marking code IP20B and/or provide an interface for an additional protection element in order to provide protection marking IP40D.

25. The touch protected busbar system according to claims 1, 2 or 3, wherein the current-carrying rail profile of the hybrid busbar comprises a C-shaped profile and one or more T-shaped profiles.

26. The touch protected busbar system according to claims 1, 2 or 3, wherein the touch protected busbar system is integrated in a housing of a distribution box or a distribution enclosure.

27. The touch protected busbar system according to claims 1, 2 or 3, wherein a configuration portion of the touch protection element comprises openings to receive coding protrusions of electrical devices to provide a reverse voltage protection of the electrical devices.

28. The touch protected busbar system according to claims 1, 2 or 3, wherein configuration portions of the touch protection elements, comprise slots to receive mechanical locking elements of electrical devices used to mount the electrical devices on said touch protection elements.

29. The touch protected busbar system according to claims 1, 2 or 3, wherein the electrical isolating touch protection elements are adapted to cover and isolate additional busbars and/or electrical conductors used to transport analog or digital information signals, AC or DC supply voltages or to provide reference potentials.

30. The touch protected busbar system according to claims 1, 2 or 3, comprising longitudinal busbar connectors adapted to connect mechanically and electrically at least one non-hybrid busbar included in the touch protected busbar system, with at least one of the at least one hybrid busbar.

* * * * *